(12) United States Patent
Lehtiniemi et al.

(10) Patent No.: US 10,366,542 B2
(45) Date of Patent: Jul. 30, 2019

(54) AUDIO PROCESSING FOR VIRTUAL OBJECTS IN THREE-DIMENSIONAL VIRTUAL VISUAL SPACE

(71) Applicant: Nokia Technologies Oy, Espoo (FI)

(72) Inventors: Arto Lehtiniemi, Lempäälä (FI); Antti Eronen, Tampere (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/680,502

(22) Filed: Aug. 18, 2017

(65) Prior Publication Data

US 2018/0061136 A1    Mar. 1, 2018

(30) Foreign Application Priority Data

Aug. 26, 2016 (EP) ..................... 16185885

(51) Int. Cl.
*G06T 19/00* (2011.01)
*G06T 19/20* (2011.01)
(Continued)

(52) U.S. Cl.
CPC ............ *G06T 19/006* (2013.01); *G06F 3/011* (2013.01); *G06T 19/20* (2013.01); *H04S 7/303* (2013.01);
(Continued)

(58) Field of Classification Search
CPC .................................................. G06T 19/006
See application file for complete search history.

(56) References Cited

U.S. PATENT DOCUMENTS 5,513,129 A  *  4/1996  Bolas ...................... G06F 3/011
                                                                    703/13
6,490,359 B1 * 12/2002  Gibson ................ G10H 1/0008
                                                                    381/119
(Continued)

FOREIGN PATENT DOCUMENTS

EP           3220660 A1 *  9/2017

OTHER PUBLICATIONS

"Modular Synthesis at Its Best", Arturia, Retrieved on Aug. 17, 2017, Webpage available at : https://www.arturia.com/products/analog-classics/modular-v.

(Continued)

*Primary Examiner* — Phong X Nguyen
(74) *Attorney, Agent, or Firm* — Alston & Bird LLP

(57) ABSTRACT

A method comprising:
causing display of a sound-source virtual visual object in a three-dimensional virtual visual space;
causing display of a multiplicity of interconnecting virtual visual objects in the three-dimensional virtual visual space, wherein at least some of the multiplicity of interconnecting virtual visual objects interconnect visually a sound-source virtual visual object and a user-controlled virtual visual object,
wherein a visual appearance of each interconnecting virtual visual object, is dependent upon one or more characteristics of a sound object associated with the sound-source virtual visual object to which the interconnecting virtual visual object is interconnected,
and wherein audio processing of the sound objects to produce rendered sound objects depends on user-interaction with the user-controlled virtual visual object and user-controlled interconnection of interconnecting vir-
(Continued)

tual visual objects between sound-source virtual visual objects and the user-controlled virtual visual object.

20 Claims, 11 Drawing Sheets

(51) Int. Cl.
*H04S 7/00* (2006.01)
*G06F 3/01* (2006.01)

(52) U.S. Cl.
CPC ... *G06T 2219/2004* (2013.01); *H04S 2400/01* (2013.01); *H04S 2400/11* (2013.01)

(56) References Cited

U.S. PATENT DOCUMENTS

| | | | | |
|---|---|---|---|---|
| 7,702,116 | B2* | 4/2010 | Stone | H04R 5/027 381/17 |
| 9,015,612 | B2* | 4/2015 | Nguyen | G06K 9/0057 715/769 |
| 2002/0196134 | A1* | 12/2002 | Lutter | H04R 5/04 340/426.1 |
| 2010/0049346 | A1* | 2/2010 | Boustead | A63F 13/12 700/94 |
| 2010/0260355 | A1* | 10/2010 | Muraoka | A63F 13/10 381/107 |
| 2010/0290638 | A1* | 11/2010 | Heineman | H04H 60/04 381/77 |
| 2012/0310396 | A1* | 12/2012 | Ojanpera | H04R 1/406 700/94 |
| 2013/0236040 | A1* | 9/2013 | Crawford | H04S 7/304 381/310 |
| 2013/0263049 | A1 | 10/2013 | Lehtiniemi et al. | |
| 2013/0290843 | A1 | 10/2013 | Lehtiniemi et al. | |
| 2013/0295961 | A1 | 11/2013 | Lehtiniemi et al. | |
| 2014/0198918 | A1* | 7/2014 | Li | H04S 7/30 381/26 |
| 2014/0328505 | A1* | 11/2014 | Heinemann | H04S 7/303 381/303 |
| 2015/0025662 | A1* | 1/2015 | Di Censo | G06F 3/011 700/94 |
| 2015/0325226 | A1* | 11/2015 | Rosedale | G10H 5/02 381/119 |
| 2016/0048310 | A1* | 2/2016 | Patil | G06F 3/04847 715/716 |
| 2017/0287218 | A1* | 10/2017 | Nuernberger | G06T 19/006 |

OTHER PUBLICATIONS

Shah et al., "Metrics for Measuring Ideation Effectiveness", Design Studies, vol. 24, No. 2, Mar. 2003, pp. 111-134.
Smith, "Idea-Generation Techniques: A Formulary of Active Ingredients", Wiley, vol. 32, No. 2, 1998, pp. 107-133.
Smith, "Towards a logic of innovation", The International Handbook on Innovation, 2003. p. 347-365.
Extended European Search Report received for corresponding European Patent Application No. 16185885.7, dated Nov. 28, 2016, 7 pages.

* cited by examiner

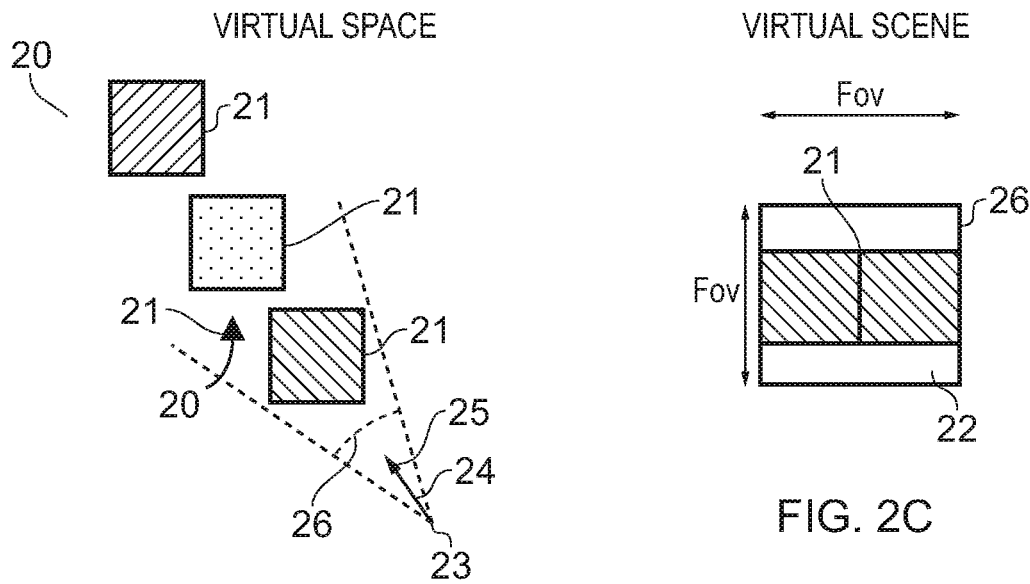
FIG. 1C
FIG. 2C
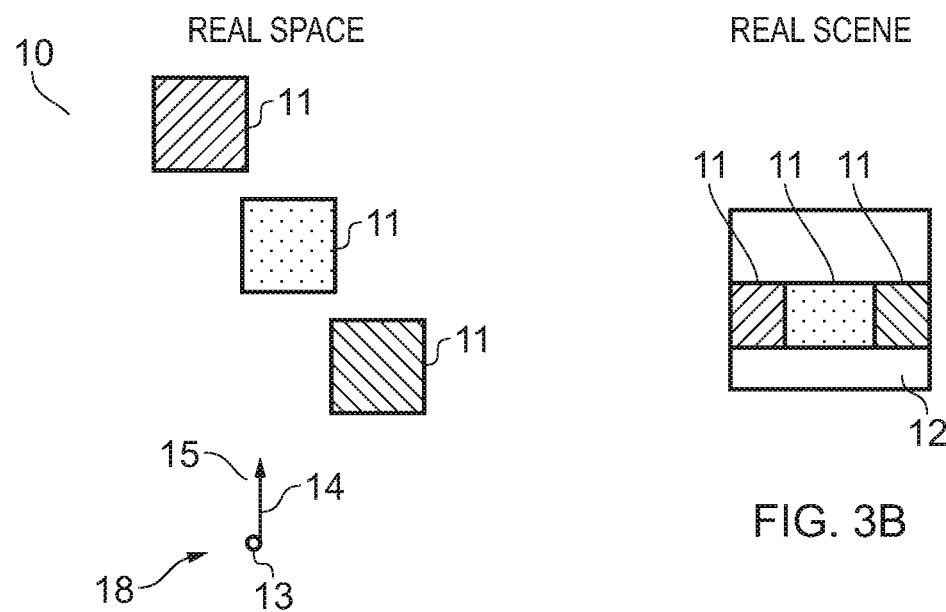
FIG. 3A
FIG. 3B

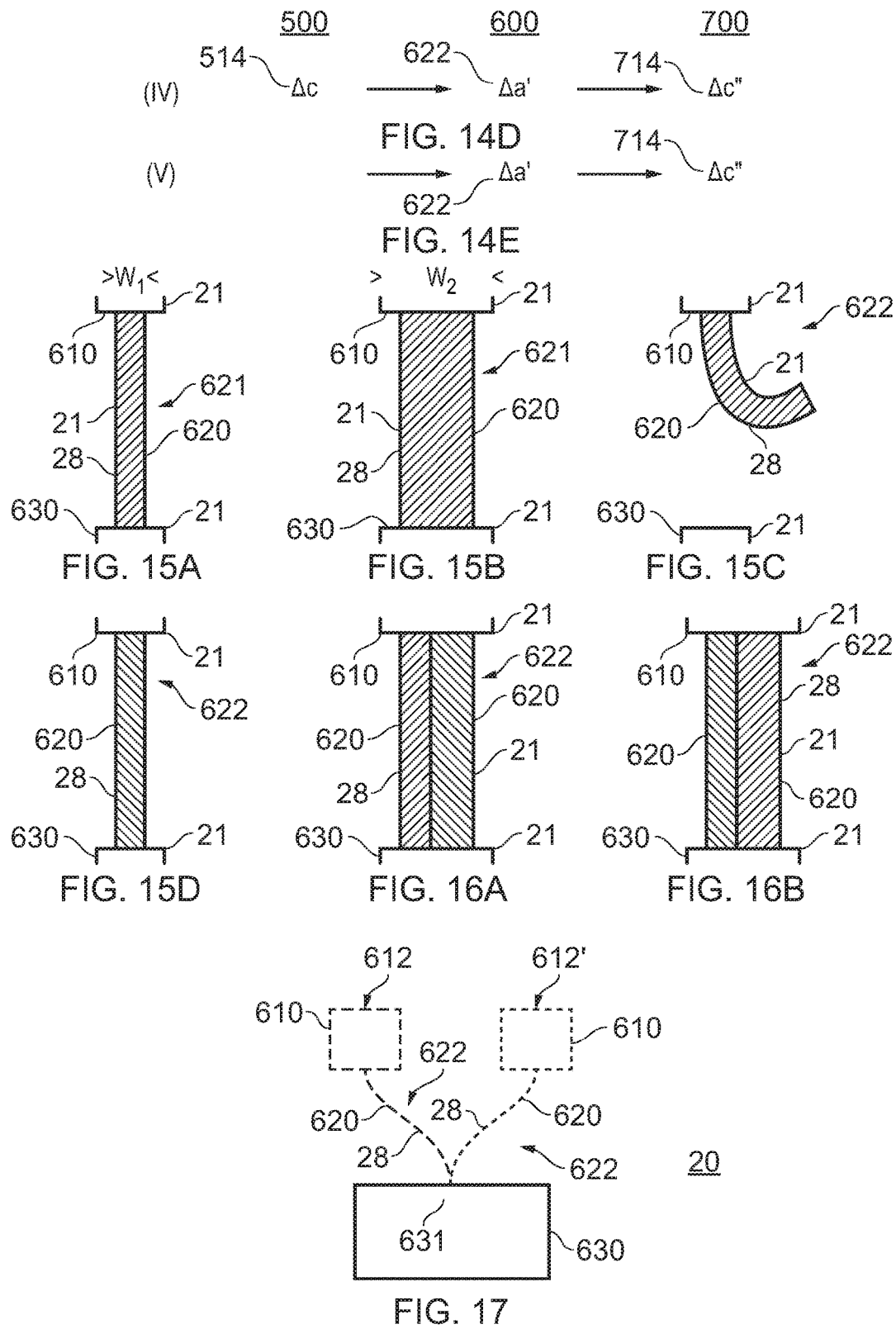

US 10,366,542 B2

AUDIO PROCESSING FOR VIRTUAL OBJECTS IN THREE-DIMENSIONAL VIRTUAL VISUAL SPACE

TECHNOLOGICAL FIELD

Embodiments of the present invention relate to audio processing. Some but not necessarily all examples relate to user control of audio processing via mediated reality for example augmented reality or virtual reality.

BACKGROUND

Mediated reality in this document refers to a user experiencing or being capable of experiencing a fully or partially artificial environment.

Augmented reality is a form of mediated reality in which a user experiences a partially artificial, partially real environment. Virtual reality is a form of mediated reality in which a user experiences a fully artificial environment.

BRIEF SUMMARY

According to various, but not necessarily all, embodiments of the invention there is provided a method comprising:

causing display of a sound-source virtual visual object in a three-dimensional virtual visual space;

causing display of a multiplicity of interconnecting virtual visual objects in the three-dimensional virtual visual space, wherein at least some of the multiplicity of interconnecting virtual visual objects interconnect visually a sound-source virtual visual object and a user-controlled virtual visual object, wherein a visual appearance of each interconnecting virtual visual object, is dependent upon one or more characteristics of a sound object associated with the sound-source virtual visual object to which the interconnecting virtual visual object is interconnected, and wherein audio processing of the sound objects to produce rendered sound objects depends on user-interaction with the user-controlled virtual visual object and user-controlled interconnection of interconnecting virtual visual objects between sound-source virtual visual objects and the user-controlled virtual visual object.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene that partially corresponds with the virtual visual scene of FIG. 1B;

FIGS. 14A to 14E illustrate different examples of how audio processing of sound objects to produce rendered sound objects depends on the sound-source virtual visual objects and the interconnecting virtual visual objects 620.

FIGS. 15A to 16B illustrate different examples in which the interconnecting virtual visual object may have its appearance varied;

FIG. 17 illustrates an example of a virtual visual space and illustrates a sound-source virtual visual object at different positions at different times;

DEFINITIONS

Figures 1A, 2A:
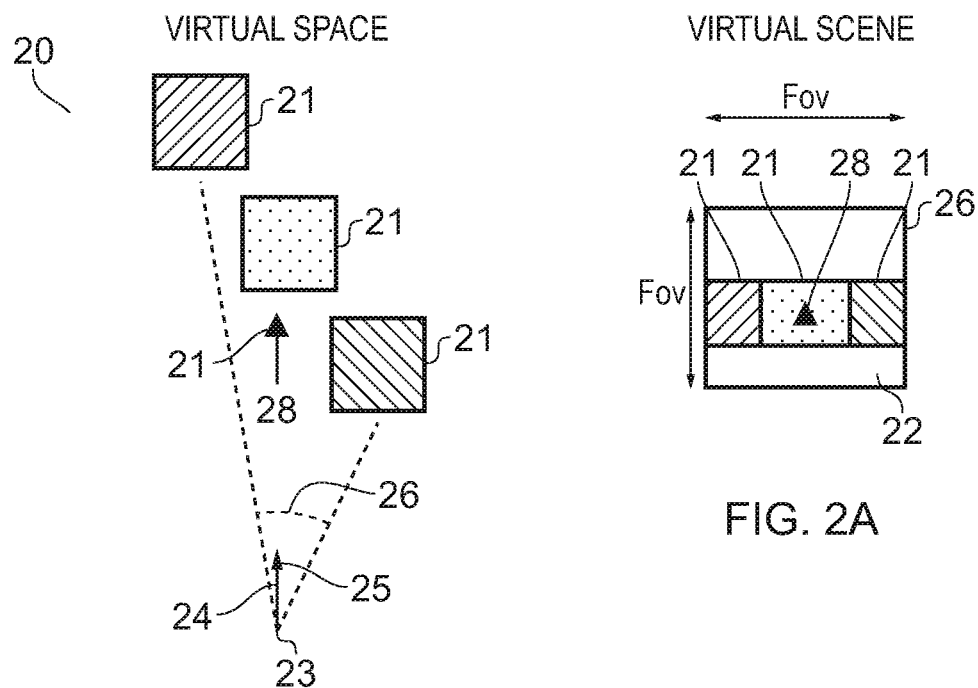

"artificial environment" is something that has been recorded or generated.

"virtual visual space" refers to fully or partially artificial environment that may be viewed, which may be three dimensional.

"virtual visual scene" refers to a representation of the virtual visual space viewed from a particular point of view within the virtual visual space.

'virtual visual object' is a visible virtual object within a virtual visual scene.

"real space" refers to a real environment, which may be three dimensional.

"real visual scene" refers to a representation of the real space viewed from a particular point of view within the real space.

"mediated reality" in this document refers to a user visually experiencing a fully or partially artificial environment (a virtual visual space) as a virtual visual scene at least partially displayed by an apparatus to a user. The virtual visual scene is determined by a point of view within the virtual visual space and a field of view. Displaying the virtual visual scene means providing it in a form that can be seen by the user.

"augmented reality" in this document refers to a form of mediated reality in which a user visually experiences a partially artificial environment (a virtual visual space) as a virtual visual scene comprising a real visual scene of a physical real world environment (real space) supplemented by one or more visual elements displayed by an apparatus to a user;

"virtual reality" in this document refers to a form of mediated reality in which a user visually experiences a fully artificial environment (a virtual visual space) as a virtual visual scene displayed by an apparatus to a user;

"perspective-mediated" as applied to mediated reality, augmented reality or virtual reality means that user actions determine the point of view within the virtual visual space, changing the virtual visual scene;

"first person perspective-mediated" as applied to mediated reality, augmented reality or virtual reality means perspective mediated with the additional constraint that the user's real point of view determines the point of view within the virtual visual space;

"third person perspective-mediated" as applied to mediated reality, augmented reality or virtual reality means perspective mediated with the additional constraint that the user's real point of view does not determine the point of view within the virtual visual space;

"user interactive" as applied to mediated reality, augmented reality or virtual reality means that user actions at least partially determine what happens within the virtual visual space;

"displaying" means providing in a form that is perceived visually (viewed) by the user.

"rendering" means providing in a form that is perceived by the user

"sound space" refers to an arrangement of sound sources in a three-dimensional space. A sound space may be defined in relation to recording sounds (a recorded sound space) and in relation to rendering sounds (a rendered sound space).

"sound scene" refers to a representation of the sound space listened to from a particular point of view within the sound space.

"sound object" refers to sound that may be located within the sound space. A source sound object represents a sound source within the sound space. A recorded sound object represents sounds recorded at a particular microphone or position. A rendered sound object represents sounds rendered from a particular position.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene means that the sound space and virtual visual space are corresponding and a notional listener whose point of view defines the sound scene and a notional viewer whose point of view defines the virtual visual scene are at the same position and orientation, that is they have the same point of view.

"virtual space" may mean a virtual visual space, mean a sound space or mean a combination of a virtual visual space and corresponding sound space.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

DESCRIPTION

FIGS. 1A-1C and 2A-2C illustrate examples of mediated reality. The mediated reality may be augmented reality or virtual reality.

Figures 1B, 2B:
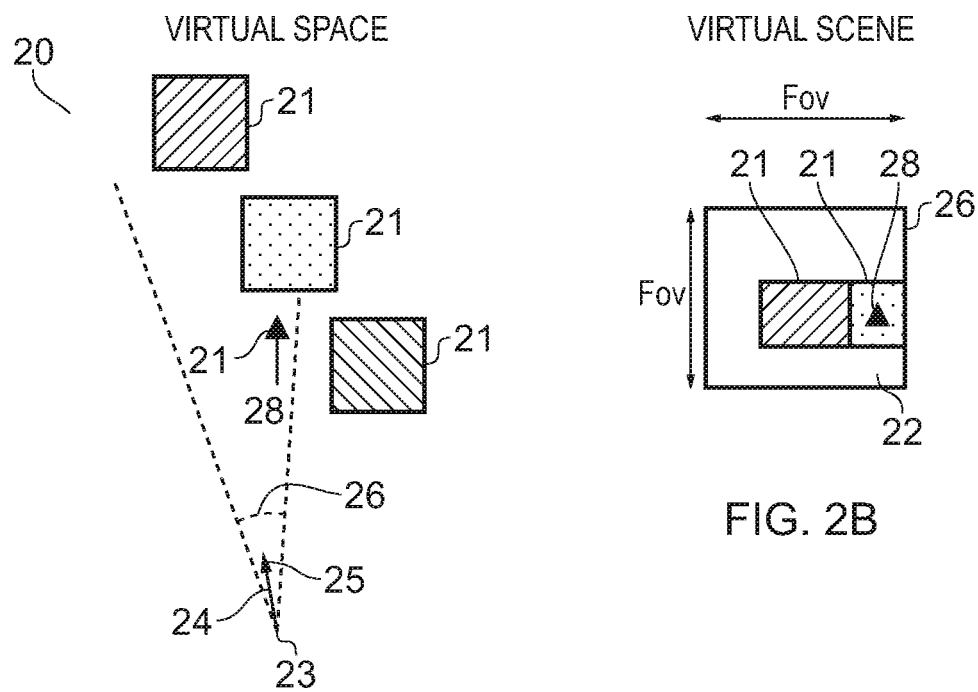

FIGS. 1A, 1B, 1C illustrate the same virtual visual space 20 comprising the same virtual visual objects 21, however, each Fig illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a position 23 of the point of view 24 within the virtual visual space 20 may be changed and/or a direction or orientation 25 of the point of view 24 within the virtual visual space 20 may be changed. If the virtual visual space 20 is three-dimensional, the position 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates a real visual scene 12 that partially corresponds with the virtual visual scene 22 of FIG. 1B, it includes real objects 11 but not artificial virtual objects. The real visual scene is from a perspective corresponding to the point of view 24 in the virtual visual space 20 of FIG. 1A. The real visual scene 12 content is determined by that corresponding point of view 24 and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view 24 at the same time, processed to generate an image from a single point of view 24.

Figure 4:
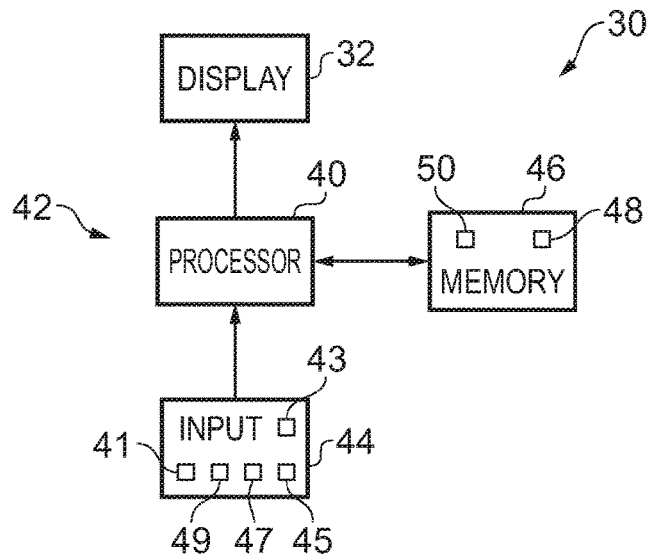
FIG. 4 illustrates an example of an apparatus that is operable to enable mediated reality and/or augmented reality and/or virtual reality.

FIG. 4 illustrates an example of an apparatus 30 that is operable to enable mediated reality and/or augmented reality and/or virtual reality.

The apparatus 30 comprises a display 32 for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5A & 5B. The processor 40 by reading the memory 46 is able to load and execute the computer program 48.

Figure 5A:
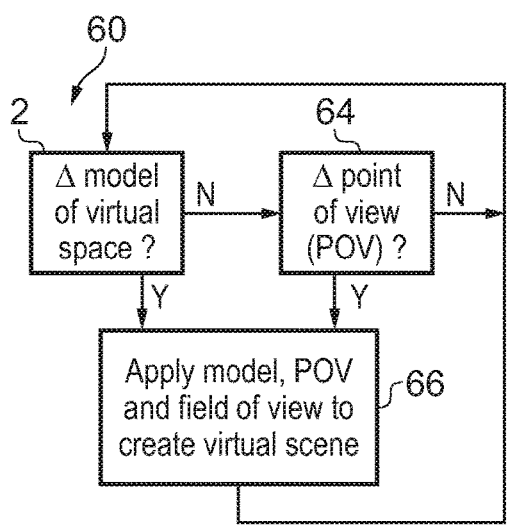
FIG. 5A illustrates an example of a method for enabling mediated reality and/or augmented reality and/or virtual reality.
Figure 5B:
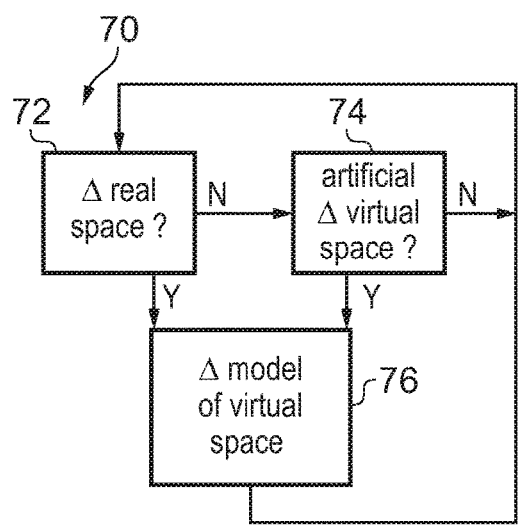
FIG. 5B illustrates an example of a method for updating a model of the virtual visual space for augmented reality.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it77 may be possible for some blocks to be omitted.

The apparatus 30 may enable mediated reality and/or augmented reality and/or virtual reality, for example using the method 60 illustrated in FIG. 5A or a similar method. The controller 42 stores and maintains a model 50 of the virtual visual space 20. The model may be provided to the controller 42 or determined by the controller 42. For example, sensors in input circuitry 44 may be used to create overlapping depth maps of the virtual visual space from different points of view and a three dimensional model may then be produced.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a position of the object.

At block 62 it is determined whether or not the model of the virtual visual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is then limited by the field of view 26 to produce the virtual visual scene 22. The method then returns to block 62.

Where the apparatus 30 enables augmented reality, the virtual visual space 20 comprises objects 11 from the real space 10 and also visual elements 28 not present in the real space 10. The combination of such visual elements 28 may be referred to as the artificial virtual visual space. FIG. 5B illustrates a method 70 for updating a model of the virtual visual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual visual space 20, changing the virtual visual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual visual space 20, changing the virtual visual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation by measuring a change in orientation of the user's head and/or a change in the user's direction of gaze.

In some but not necessarily all examples, the apparatus 30 comprises as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
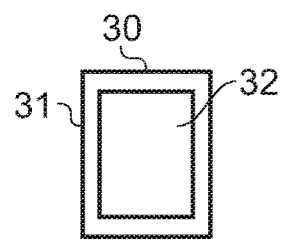
FIGS. 6A and 6B illustrate examples of apparatus that enable display of at least parts of the virtual visual scene to a user.
Figure 6B:
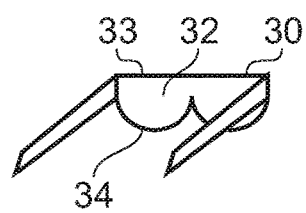

FIGS. 6A and 6B illustrate examples of apparatus 30 that enable display of at least parts of the virtual visual scene 22 to a user.

FIG. 6A illustrates a handheld apparatus 31 comprising a display screen as display 32 that displays images to a user and is used for displaying the virtual visual scene 22 to the user. The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30.

The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 6B illustrates a head-mounted apparatus 33 comprising a display 32 that displays images to a user. The head-mounted apparatus 33 may be moved automatically when a head of the user moves. The head-mounted apparatus 33 may house the sensors 45 for gaze direction detection and/or selection gesture detection.

The head-mounted apparatus 33 may be a see-through arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Other examples of apparatus 30 that enable display of at least parts of the virtual visual scene 22 to a user may be used.

For example, one or more projectors may be used that project one or more visual elements to provide augmented reality by supplementing a real visual scene of a physical real world environment (real space).

For example, multiple projectors or displays may surround a user to provide virtual reality by presenting a fully artificial environment (a virtual visual space) as a virtual visual scene to the user.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in gesture recognition.

Figure 7A:
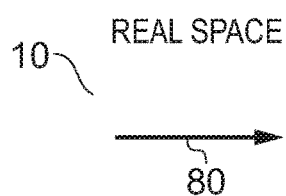
FIG. 7A, illustrates an example of a gesture in real space

Referring to FIG. 7A, a particular gesture 80 in the real space 10 is a gesture user input used as a 'user control' event by the controller 42 to determine what happens within the virtual visual space 20. A gesture user input is a gesture 80 that has meaning to the apparatus 30 as a user input.

Figure 7B:
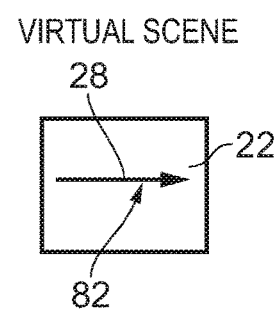
FIG. 7B, illustrates a corresponding representation rendered, in the virtual visual scene, of the gesture in real space.

Referring to FIG. 7B, illustrates that in some but not necessarily all examples, a corresponding representation of the gesture 80 in real space is rendered in the virtual visual scene 22 by the apparatus 30. The representation involves one or more visual elements 28 moving 82 to replicate or indicate the gesture 80 in the virtual visual scene 22.

A gesture 80 may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A gesture 80 may be a non-contact gesture. A non-contact gesture does not contact the sensors at any time during the gesture.

A gesture 80 may be an absolute gesture that is defined in terms of an absolute displacement from the sensors. Such a gesture may be tethered, in that it is performed at a precise location in the real space 10. Alternatively a gesture 80 may be a relative gesture that is defined in terms of relative displacement during the gesture. Such a gesture may be un-tethered, in that it need not be performed at a precise location in the real space 10 and may be performed at a large number of arbitrary locations.

A gesture 80 may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$.

A gesture 80 may be performed in one spatial dimension (1D gesture), two spatial dimensions (2D gesture) or three spatial dimensions (3D gesture).

Figure 8:
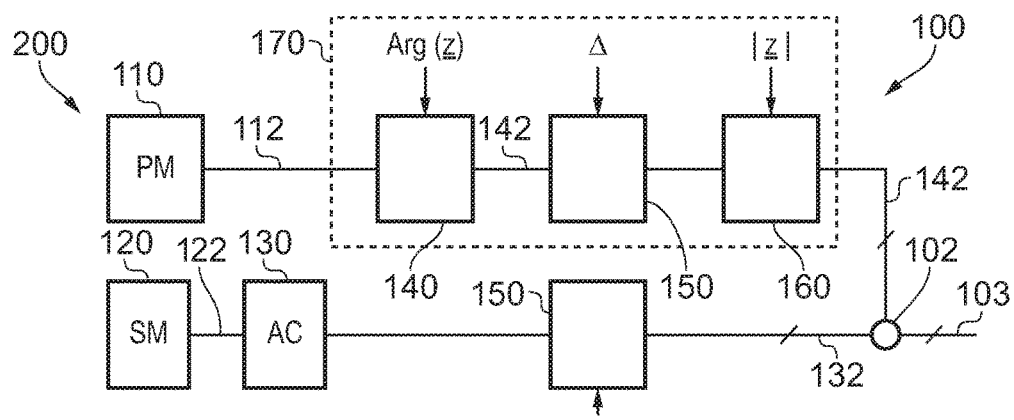
FIG. 8 illustrates an example of a system for modifying a rendered sound scene.

FIG. 8 illustrates an example of a system 100 and also an example of a method 200. The system 100 and method 200 record a sound space and process the recorded sound space to enable a rendering of the recorded sound space as a rendered sound scene for a listener at a particular position (the origin) and orientation within the sound space.

A sound space is an arrangement of sound sources in a three-dimensional space. A sound space may be defined in relation to recording sounds (a recorded sound space) and in relation to rendering sounds (a rendered sound space).

The system 100 comprises one or more portable microphones 110 and may comprise one or more static microphones 120.

In this example, but not necessarily all examples, the origin of the sound space is at a microphone. In this example, the microphone at the origin is a static microphone 120. It may record one or more channels, for example it may be a microphone array. However, the origin may be at any arbitrary position.

In this example, only a single static microphone 120 is illustrated. However, in other examples multiple static microphones 120 may be used independently.

The system 100 comprises one or more portable microphones 110. The portable microphone 110 may, for example, move with a sound source within the recorded sound space.

The portable microphone may, for example, be an 'up-close' microphone that remains close to a sound source. This may be achieved, for example, using a boom microphone or, for example, by attaching the microphone to the sound source, for example, by using a Lavalier microphone. The portable microphone 110 may record one or more recording channels.

The relative position of the portable microphone PM 110 from the origin may be represented by the vector z. The vector z therefore positions the portable microphone 110 relative to a notional listener of the recorded sound space.

The relative orientation of the notional listener at the origin may be represented by the value Δ. The orientation value Δ defines the notional listener's 'point of view' which defines the sound scene. The sound scene is a representation of the sound space listened to from a particular point of view within the sound space.

When the sound space as recorded is rendered to a user (listener) via the system 100 in FIG. 1, it is rendered to the listener as if the listener is positioned at the origin of the recorded sound space with a particular orientation. It is therefore important that, as the portable microphone 110 moves in the recorded sound space, its position z relative to the origin of the recorded sound space is tracked and is correctly represented in the rendered sound space. The system 100 is configured to achieve this.

The audio signals 122 output from the static microphone 120 are coded by audio coder 130 into a multichannel audio signal 132. If multiple static microphones were present, the output of each would be separately coded by an audio coder into a multichannel audio signal.

The audio coder 130 may be a spatial audio coder such that the multichannel audio signals 132 represent the sound space as recorded by the static microphone 120 and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc. If multiple static microphones were present, the multichannel signal of each static microphone would be produced according to the same defined standard such as, for example, binaural coding, 5.1 surround sound coding, and 7.1 surround sound coding and in relation to the same common rendered sound space.

The multichannel audio signals 132 from one or more the static microphones 120 are mixed by mixer 102 with multichannel audio signals 142 from the one or more portable microphones 110 to produce a multi-microphone multichannel audio signal 103 that represents the recorded sound scene relative to the origin and which can be rendered by an audio decoder corresponding to the audio coder 130 to reproduce a rendered sound scene to a listener that corresponds to the recorded sound scene when the listener is at the origin.

The multichannel audio signal 142 from the, or each, portable microphone 110 is processed before mixing to take account of any movement of the portable microphone 110 relative to the origin at the static microphone 120.

The audio signals 112 output from the portable microphone 110 are processed by the positioning block 140 to adjust for movement of the portable microphone 110 relative to the origin. The positioning block 140 takes as an input the vector z or some parameter or parameters dependent upon the vector z. The vector z represents the relative position of the portable microphone 110 relative to the origin.

The positioning block 140 may be configured to adjust for any time misalignment between the audio signals 112 recorded by the portable microphone 110 and the audio signals 122 recorded by the static microphone 120 so that they share a common time reference frame. This may be achieved, for example, by correlating naturally occurring or artificially introduced (non-audible) audio signals that are present within the audio signals 112 from the portable microphone 110 with those within the audio signals 122 from the static microphone 120. Any timing offset identified by the correlation may be used to delay/advance the audio signals 112 from the portable microphone 110 before processing by the positioning block 140.

The positioning block 140 processes the audio signals 112 from the portable microphone 110, taking into account the relative orientation (Arg(z)) of that portable microphone 110 relative to the origin at the static microphone 120.

The audio coding of the static microphone audio signals 122 to produce the multichannel audio signal 132 assumes a particular orientation of the rendered sound space relative to an orientation of the recorded sound space and the audio signals 122 are encoded to the multichannel audio signals 132 accordingly.

The relative orientation Arg (z) of the portable microphone 110 in the recorded sound space is determined and the audio signals 112 representing the sound object are coded to the multichannels defined by the audio coding 130 such that the sound object is correctly oriented within the rendered sound space at a relative orientation Arg (z) from the listener. For example, the audio signals 112 may first be mixed or encoded into the multichannel signals 142 and then a transformation T may be used to rotate the multichannel audio signals 142, representing the moving sound object, within the space defined by those multiple channels by Arg (z).

An orientation block 150 may be used to rotate the multichannel audio signals 142 by Δ, if necessary. Similarly, an orientation block 150 may be used to rotate the multichannel audio signals 132 by Δ, if necessary.

The functionality of the orientation block 150 is very similar to the functionality of the orientation function of the positioning block 140 except it rotates by Δ instead of Arg(z).

In some situations, for example when the sound scene is rendered to a listener through a head-mounted audio output device 300, for example headphones using binaural audio coding, it may be desirable for the rendered sound space 310 to remain fixed in space 320 when the listener turns their head 330 in space. This means that the rendered sound space 310 needs to be rotated relative to the audio output device 300 by the same amount in the opposite sense to the head rotation. The orientation of the rendered sound space 310 tracks with the rotation of the listener's head so that the orientation of the rendered sound space 310 remains fixed in space 320 and does not move with the listener's head 330.

The portable microphone signals 112 are additionally processed to control the perception of the distance D of the sound object from the listener in the rendered sound scene, for example, to match the distance |z| of the sound object from the origin in the recorded sound space. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 9:
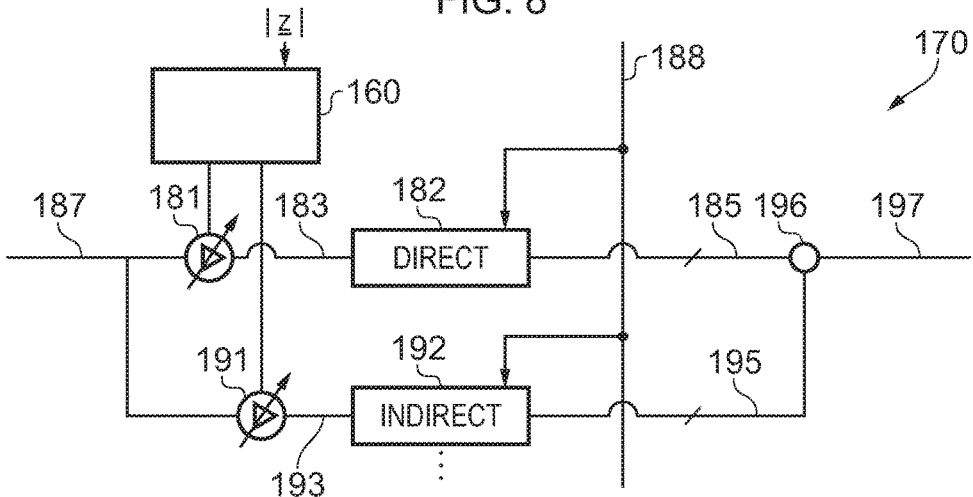
FIG. 9 illustrates an example of a module which may be used, for example, to perform the functions of the positioning block, orientation block and distance block of the system.

FIG. 9 illustrates a module 170 which may be used, for example, to perform the method 200 and/or functions of the positioning block 140, orientation block 150 and distance block 160 in FIG. 8. The module 170 may be implemented using circuitry and/or programmed processors.

The Figure illustrates the processing of a single channel of the multichannel audio signal 142 before it is mixed with the multichannel audio signal 132 to form the multi-microphone multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signal 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear to a listener to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound space 310.

Each of the parallel paths comprises a variable gain device 181, 191 which is controlled by the distance block 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the distance block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the distance block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 188 gives the orientation Arg(z) of the portable microphone 110 (moving sound object) in the recorded sound space and the orientation $\Delta$ of the rendered sound space 310 relative to the notional listener/audio output device 300.

The position of the moving sound object changes as the portable microphone 110 moves in the recorded sound space and the orientation of the rendered sound space changes as a head-mounted audio output device, rendering the sound space rotates.

The direct processing block 182 may, for example, include a system 184 that rotates the single channel audio signal, gain-adjusted input signal 183, in the appropriate multichannel space producing the direct multichannel audio signal 185. The system uses a transfer function to performs a transformation T that rotates multichannel signals within the space defined for those multiple channels by Arg(z) and by $\Delta$, defined by the direction of arrival signal 188. For example, a head related transfer function (HRTF) interpolator may be used for binaural audio. As another example, Vector Base Amplitude Panning (VBAP) may be used for loudspeaker format (e.g. 5.1) audio.

The indirect processing block 192 may, for example, use the direction of arrival signal 188 to control the gain of the single channel audio signal, the gain-adjusted input signal 193, using a variable gain device 194. The amplified signal is then processed using a static decorrelator 196 and a static transformation T to produce the indirect multichannel audio signal 195. The static decorrelator in this example uses a pre-delay of at least 2 ms. The transformation T rotates multichannel signals within the space defined for those multiple channels in a manner similar to the direct system but by a fixed amount. For example, a static head related transfer function (HRTF) interpolator may be used for binaural audio.

It will therefore be appreciated that the module 170 can be used to process the portable microphone signals 112 and perform the functions of:

(i) changing the relative position (orientation Arg(z) and/or distance |z|) of a rendered sound object, from a listener in the rendered sound space and (ii) changing the orientation of the rendered sound space (including the rendered sound object positioned according to (i)).

It should also be appreciated that the module 170 may also be used for performing the function of the orientation block 150 only, when processing the audio signals 122 provided by the static microphone 120. However, the direction of arrival signal will include only $\Delta$ and will not include Arg(z). In some but not necessarily all examples, gain of the variable gain devices 191 modifying the gain to the indirect paths may be put to zero and the gain of the variable gain device 181 for the direct path may be fixed. In this instance, the module 170 reduces to a system that rotates the recorded sound space to produce the rendered sound space according to a direction of arrival signal that includes only $\Delta$ and does not include Arg(z).

Figure 10:
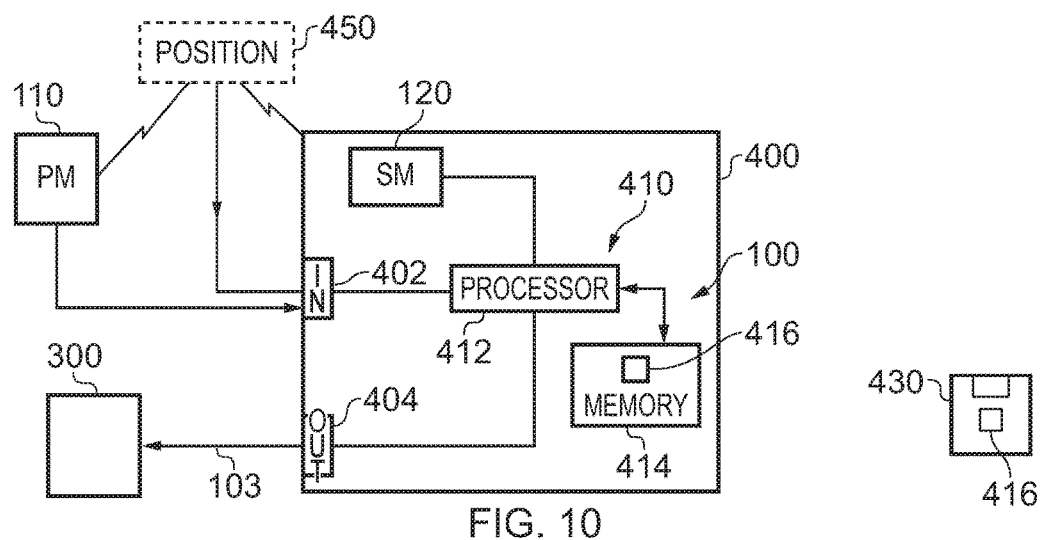
FIG. 10 illustrates an example of the system/module implemented using an apparatus.

FIG. 10 illustrates an example of the system 100 implemented using an apparatus 400. The apparatus 400 may, for example, be a static electronic device, a portable electronic device or a hand-portable electronic device that has a size that makes it suitable to carried on a palm of a user or in an inside jacket pocket of the user.

In this example, the apparatus 400 comprises the static microphone 120 as an integrated microphone but does not comprise the one or more portable microphones 110 which are remote. In this example, but not necessarily all examples, the static microphone 120 is a microphone array. However, in other examples, the apparatus 400 does not comprise the static microphone 120.

The apparatus 400 comprises an external communication interface 402 for communicating externally with external microphones, for example, the remote portable microphone(s) 110. This may, for example, comprise a radio transceiver.

A positioning system 450 is illustrated as part of the system 100. This positioning system 450 is used to position the portable microphone(s) 110 relative to the origin of the sound space e.g. the static microphone 120. In this example, the positioning system 450 is illustrated as external to both the portable microphone 110 and the apparatus 400. It provides information dependent on the position z of the portable microphone 110 relative to the origin of the sound space to the apparatus 400. In this example, the information is provided via the external communication interface 402, however, in other examples a different interface may be used. Also, in other examples, the positioning system may be wholly or partially located within the portable microphone 110 and/or within the apparatus 400.

The position system 450 provides an update of the position of the portable microphone 110 with a particular frequency and the term 'accurate' and 'inaccurate' positioning of the sound object should be understood to mean accurate or inaccurate within the constraints imposed by the frequency of the positional update. That is accurate and inaccurate are relative terms rather than absolute terms.

The position system 450 enables a position of the portable microphone 110 to be determined. The position system 450 may receive positioning signals and determine a position which is provided to the processor 412 or it may provide positioning signals or data dependent upon positioning signals so that the processor 412 may determine the position of the portable microphone 110.

There are many different technologies that may be used by a position system 450 to position an object including passive systems where the positioned object is passive and does not produce a positioning signal and active systems where the positioned object produces one or more positioning signals. An example of system, used in the Kinect™ device, is when an object is painted with a non-homogenous pattern of symbols using infrared light and the reflected light is measured using multiple cameras and then processed, using the parallax effect, to determine a position of the object. An example of an active radio positioning system is when an object has a transmitter that transmits a radio positioning signal to multiple receivers to enable the object to be positioned by, for example, trilateration or triangulation. The transmitter may be a Bluetooth tag or a radio-frequency identification (RFID) tag, as an example. An example of a passive radio positioning system is when an object has a receiver or receivers that receive a radio positioning signal from multiple transmitters to enable the object to be positioned by, for example, trilateration or triangulation. Trilateration requires an estimation of a distance of the object from multiple, non-aligned, transmitter/receiver locations at known positions. A distance may, for example, be estimated using time of flight or signal attenuation. Triangulation requires an estimation of a bearing of the object from multiple, non-aligned, transmitter/receiver locations at known positions. A bearing may, for example, be estimated using a transmitter that transmits with a variable narrow aperture, a receiver that receives with a variable narrow aperture, or by detecting phase differences at a diversity receiver.

Other positioning systems may use dead reckoning and inertial movement or magnetic positioning.

The object that is positioned may be the portable microphone 110 or it may an object worn or carried by a person associated with the portable microphone 110 or it may be the person associated with the portable microphone 110.

The apparatus 400 wholly or partially operates the system 100 and method 200 described above to produce a multi-microphone multichannel audio signal 103.

The apparatus 400 provides the multi-microphone multichannel audio signal 103 via an output communications interface 404 to an audio output device 300 for rendering.

In some but not necessarily all examples, the audio output device 300 may use binaural coding. Alternatively or additionally, in some but not necessarily all examples, the audio output device 300 may be a head-mounted audio output device.

In this example, the apparatus 400 comprises a controller 410 configured to process the signals provided by the static microphone 120 and the portable microphone 110 and the positioning system 450. In some examples, the controller 410 may be required to perform analogue to digital conversion of signals received from microphones 110, 120 and/or perform digital to analogue conversion of signals to the audio output device 300 depending upon the functionality at the microphones 110, 120 and audio output device 300. However, for clarity of presentation no converters are illustrated in FIG. 9.

Implementation of a controller 410 may be as controller circuitry. The controller 410 may be implemented in hardware alone, have certain aspects in software including firmware alone or can be a combination of hardware and software (including firmware).

As illustrated in FIG. 10 the controller 410 may be implemented using instructions that enable hardware functionality, for example, by using executable instructions of a computer program 416 in a general-purpose or special-purpose processor 412 that may be stored on a computer readable storage medium (disk, memory etc) to be executed by such a processor 412.

The processor 412 is configured to read from and write to the memory 414. The processor 412 may also comprise an output interface via which data and/or commands are output by the processor 412 and an input interface via which data and/or commands are input to the processor 412.

The memory 414 stores a computer program 416 comprising computer program instructions (computer program code) that controls the operation of the apparatus 400 when loaded into the processor 412. The computer program instructions, of the computer program 416, provide the logic and routines that enables the apparatus to perform the methods illustrated in FIGS. 1-19. The processor 412 by reading the memory 414 is able to load and execute the computer program 416.

The blocks illustrated in the FIGS. 8 and 9 may represent steps in a method and/or sections of code in the computer program 416. The illustration of a particular order to the blocks does not necessarily imply that there is a required or preferred order for the blocks and the order and arrangement of the block may be varied. Furthermore, it may be possible for some blocks to be omitted.

The preceding description describes, in relation to FIGS. 1 to 7, a system, apparatus 30, method 60 and computer program 48 that enables control of a virtual visual space 20 and the virtual visual scene 26 dependent upon the virtual visual space 20.

The preceding description describe, in relation to FIGS. 8 to 10, a system 100, apparatus 400, method 200 and computer program 416 that enables control of a sound space and the sound scene dependent upon the sound space.

In some but not necessarily all examples, the virtual visual space 20 and the sound space may be corresponding. "Correspondence" or "corresponding" when used in relation to a sound space and a virtual visual space means that the sound space and virtual visual space are time and space aligned, that is they are the same space at the same time.

The correspondence between virtual visual space and sound space results in correspondence between the virtual visual scene and the sound scene. "Correspondence" or "corresponding" when used in relation to a sound scene and a virtual visual scene means that the sound space and virtual visual space are corresponding and a notional listener whose point of view defines the sound scene and a notional viewer whose point of view defines the virtual visual scene are at the same position and orientation, that is they have the same point of view.

The following description describes in relation to FIGS. 11 to 19 a method 520 that enables audio processing, for example spatial audio processing, to be visualized within a virtual visual space 20 using, in particular an arrangement (e.g. routing) and/or appearance of interconnecting virtual visual objects 620 between other virtual objects 21.

Figure 11:
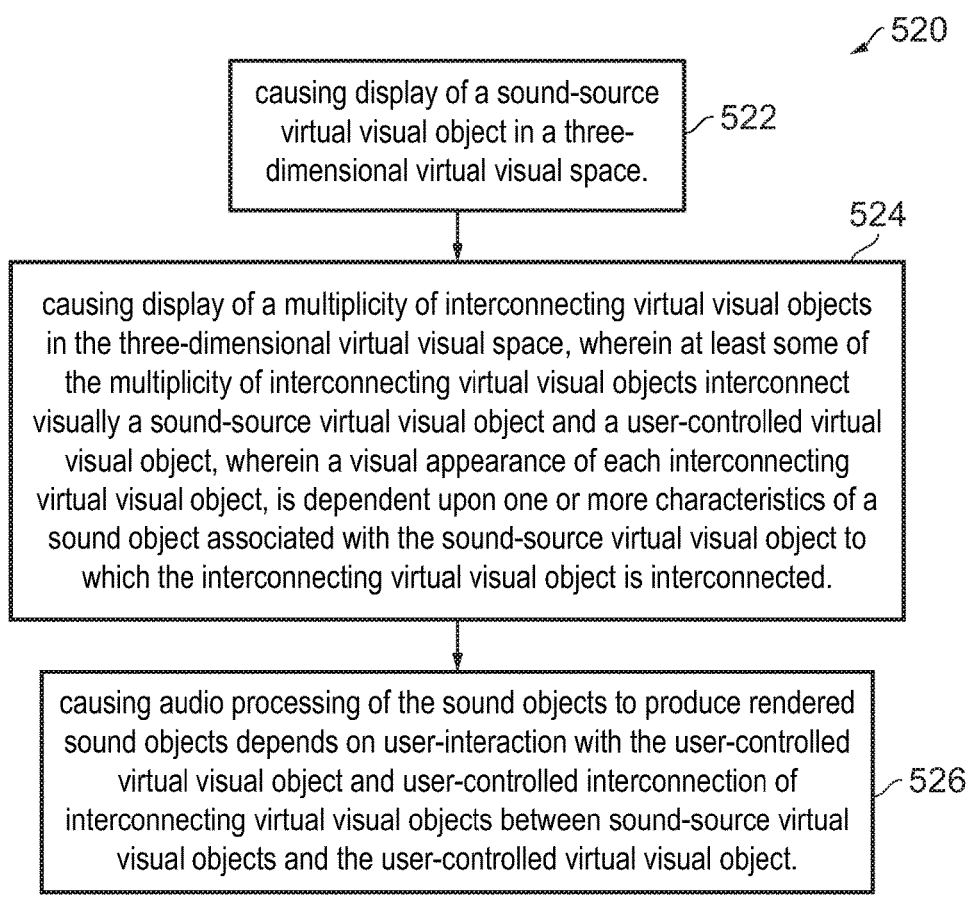
FIG. 11 illustrates an example of a method that enables audio processing, for example spatial audio processing, to be visualized within a virtual visual space using, in particular an arrangement and/or appearance of interconnecting virtual visual objects between other virtual objects.

FIG. 11 illustrates an example of the method 520 which will be described in more detail with reference to FIGS. 11 to 19.

The method 520 comprises at block 522 causing display of a sound-source virtual visual object 610 in a three-dimensional virtual visual space 20.

The method 520 comprises at block 524 causing display of a multiplicity of interconnecting virtual visual objects 620 in the three-dimensional virtual visual space 20. At least some of the multiplicity of interconnecting virtual visual objects 620 interconnect visually a sound-source virtual visual object 610 and a user-controlled virtual visual object 630. A visual appearance 622 of an interconnecting virtual visual object 620, is dependent upon one or more characteristics 514 of a sound object 510 associated with the sound-source virtual visual object 610 to which the interconnecting virtual visual object 620 is interconnected.

The method 520 then comprises at block 526 causing audio processing of the sound objects 510 to produce rendered sound objects 710 depending on user-interaction with the user-controlled virtual visual object 630 and user-controlled interconnection of interconnecting virtual visual objects between sound-source virtual visual objects and the user-controlled virtual visual object.

Figures 12A, 12B:
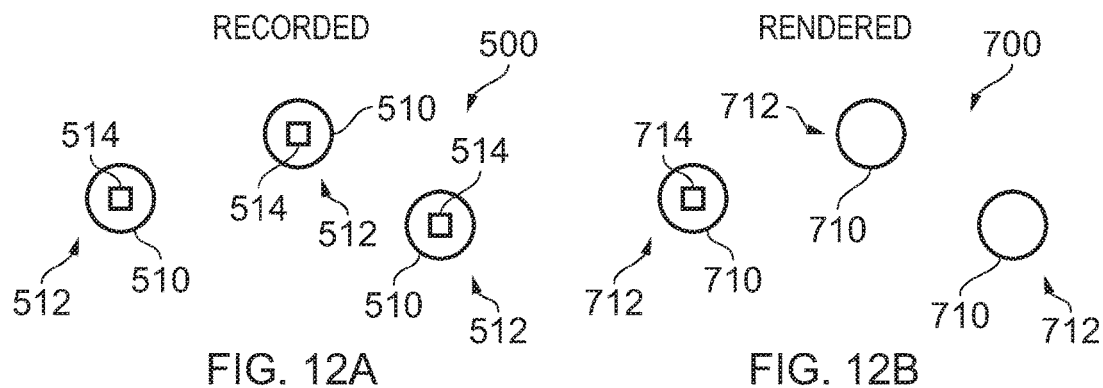
FIG. 12A illustrates an example of a sound space comprising sound objects.
FIG. 12B illustrates an example of a rendered sound scene comprising a plurality of rendered sound objects.

FIG. 12A illustrates an example of a sound space 500 comprising sound objects 510. In this example, the sound space 500 is a recorded sound space and the sound objects 510 are recorded sound objects but in other examples the sound space 500 may be a synthetic sound space and the sound objects 510 may then be sound objects artificially generated ab initio or by mixing other sound objects which may or may not comprises wholly or partly recorded sound objects.

Each sound object 510 has a position 512 in the sound space 500 and has characteristics 514 that define that sound object. The characteristics 514 may for example be audio characteristics for example based on the audio signals 112/122 output from a portable/static microphone 110/120 before or after audio coding.

Therefore in this example, block 522 of the method block 520 that causes the display of a sound-source virtual visual object 610 in a three dimensional virtual visual space 20, causes display of the sound-source virtual visual object 610 in the three dimensional virtual visual space 20 for each of a plurality of associated recorded sound objects 510 representing sounds recorded at different positions 512 in the recorded sound space 500. Each recorded sound object 510 is associated with a sound-source virtual visual object 610. Each sound-source virtual visual object 610 is associated with one or more recorded sound objects 510.

FIG. 12B illustrates an example of a rendered sound scene 700 comprising a plurality of rendered sound objects 710. In this example, the rendered sound scene 700 is a spatial audio sound scene where the rendered sound objects 710 are rendered with positions 712 and characteristics 714 within the rendered sound space 700. The rendered characteristics 714 may for example be audio characteristics for example based on the audio signals 112/122 output from a portable/static microphone 110/120 after audio coding, Audio processing of the sound objects 510 is used to produce and position the rendered sound objects 710 as previously described.

Figure 13:
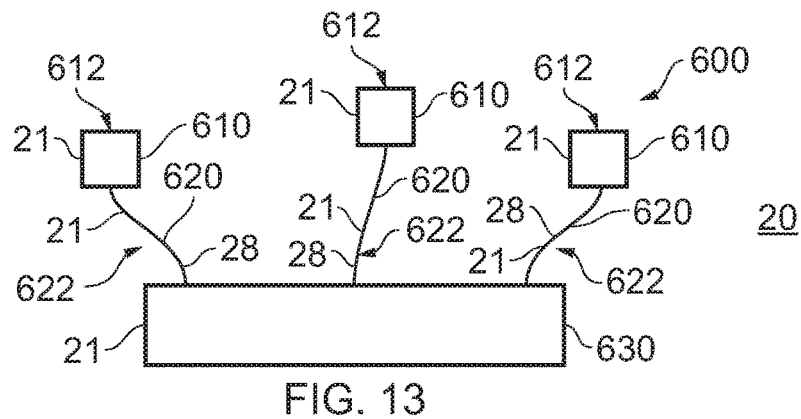
FIG. 13 illustrates multiple sound-source virtual visual objects in a three-dimensional virtual visual space.

FIG. 13 illustrates multiple sound-source virtual visual objects 610 in a three-dimensional virtual visual space 20. These are virtual objects 21. They may, for example, be displayed as visual elements 28 in the virtual visual space 20 in a virtual reality implementation. They may for example be real world objects seen through a display in an augmented reality implementation.

FIG. 13 also illustrates multiple interconnecting virtual visual objects 620 in the three-dimensional virtual visual space 20. These are virtual objects 21 displayed as artificially generated visual elements 28 in the virtual visual space 20.

At least some of each of the interconnecting virtual visual objects 620 interconnect visually a sound-source virtual visual object 610 and a user-controlled virtual visual object 630.

A visual appearance 622 of each interconnecting virtual visual object 620 is dependent upon one or more characteristics 514 of a sound object 510 associated with the sound-source virtual visual object 610 to which the interconnecting virtual visual object 620 is interconnected.

Audio processing of the sound objects 510 to produce rendered sound objects 710 depends on user-controlled interconnection of interconnecting virtual visual objects 620 between sound-source virtual visual objects 610 and the user-controlled virtual visual object 630.

Audio processing of the sound objects 510 to produce rendered sound objects 710 also depends in this example on user-interaction with the user-controlled virtual visual object 630. The user-controlled virtual visual object 630 may, for example, be a mixing desk that allows the controlled mixing of different sound sources 510 as different mixing channels. This may for example enable the production of spatial audio, where rendered sound objects are rendered with positions within a rendered sound space 700.

FIGS. 14A to 14E illustrate different examples of how audio processing of sound objects 510 to produce rendered sound objects 710 depends on the sound-source virtual visual objects 610 and the interconnecting virtual visual objects 620.

Figure 14A:
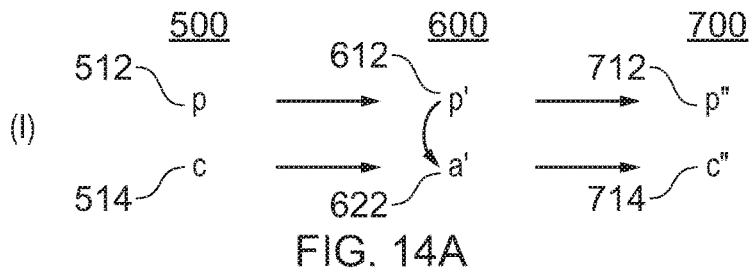

FIG. 14A illustrates that a position 712 at which a sound object 510 is rendered as a rendered sound object 710 in a rendered sound space 700 is dependent upon a position 612 of the sound-source virtual visual object 610 in the virtual visual space 20 that is associated with that sound object 510. In FIG. 14A, the sound object 510 has a position 512. In some examples the position 512 of the sound object 510 may determine the position 612 of the sound-source virtual visual object 610 associated with that sound object 510. In other examples, the user may vary the position 612 of the sound-source virtual visual object 610 associated with that sound object 510.

The position 612 of the sound-source virtual visual object 610 in this example determines the position 712 at which the sound object 510 is rendered.

In some examples the initial position at which a sound object 510 is rendered as a rendered sound object 710 in a rendered sound space 700 is dependent upon a position of the sound-source virtual visual object 610 in the virtual visual space 600 which is associated with that sound object 510. The initial position of the associated sound-source virtual visual object 610 is determined automatically by an initial position 512 of the associated sound source 510.

Each of the multiple interconnecting virtual visual objects 620 is configured to connect automatically to visually interconnect a sound-source virtual visual object 610 and the user-controlled virtual visual object 630.

The multiple interconnecting virtual visual objects 620 are also configured to automatically have a visual appearance 622 dependent upon one or more initial characteristics 514 of the sound object 510 associated with the sound-source virtual visual object 610 to which the interconnecting virtual visual object 620 is interconnected.

This is illustrated in FIG. 14A. The characteristics 514 of the sound object 510 are used to determine, at least in part, an appearance 622 of the interconnecting virtual visual object 620 associated with that sound object 510. In this example, but not necessarily all examples, the appearance 622 of the interconnecting virtual visual object 620 controls at least some aspects of the characteristics 714 of the rendered sound object 710 produced by rendering the associated sound object 510.

It will also be appreciated from FIG. 14A, that a position 612 of the sound-source virtual visual object 610 has an impact on the length and route of the interconnecting virtual visual object 620 and consequently has an impact on the appearance 622 of the interconnecting virtual visual object 620.

Figure 14B:
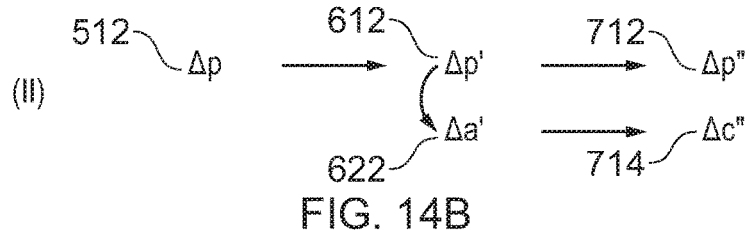

FIG. 14B illustrates the consequences of varying the position 512 of the sound object 510 in the sound space 500. In this example, varying the position 512 of the sound object 510 results in an automatic variation of the position 612 of the sound-source virtual visual object 610. This change in position 612 of the sound-source virtual visual object 610 causes an automatic change in the configuration (length and route) of the interconnecting virtual visual object 620 between that sound-source virtual visual object 610 and the user-controlled virtual visual object 630. Thus there is an automatic change in the appearance 622 of the interconnecting virtual visual object 620 that interconnects the sound-source virtual visual object 610 associated with the sound object 510 that has moved.

As previously described in relation to FIG. 14A, a change in the position 612 of the sound-source virtual visual object 610 causes a change in the position 712 of the rendered sound object 710 that is produced by rendering the sound object 510 associated with that sound-source virtual visual object 610 which has moved.

As also described in relation to FIG. 14A, a change in the appearance 622 of the interconnecting virtual visual object 620 may cause a change in the characteristics 714 of that rendered sound object 710.

Figure 14C:
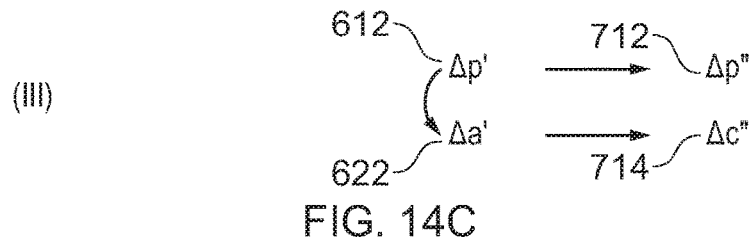

FIG. 14C is similar to FIG. 14B except that instead of the change in the position 612 of the sound-source virtual visual object being caused by a change in the position of the sound object 510 associated with that sound-source virtual visual object 610, the change in position 612 is caused by user interaction with the sound-source virtual visual object 610 within the virtual visual space 20. For example, as previously described, the user may interact with a virtual object 21, such as a sound-source virtual visual object 610, to move that virtual object 21 within the virtual visual space 20. The consequential changes of changing the position 612 of the sound-source virtual visual object 610 are the same as described in relation to FIG. 14B.

FIG. 14D illustrates an example in which the characteristics 514 of a sound object 510 are changed and this causes a consequential automatic change in the appearance 622 of the interconnecting virtual visual object 620 that interconnects the sound-source virtual visual object 610 associated with that sound object 510 that has had a change in characteristics 514. This change in the characteristics 514 of the sound object 510 has a consequential impact on the rendering of the rendered sound object 710 produced by the rendering of that sound object 510 as previously described. The characteristics 714 of the rendered sound object 710 are different, based upon the changed characteristics 514 of the sound object 510.

FIG. 14E illustrates an example which may occur in some but not necessarily all examples. In this example, the change in the appearance 622 of the interconnecting virtual visual object 620 is not caused automatically by a change in the characteristics 514 of the sound object 510 associated with the sound-source virtual visual object to which the interconnecting virtual visual object 610 is interconnected. Rather in this case, the change in the appearance 622 of the interconnecting virtual visual object 620 is caused by user interaction, in the virtual visual space 20, by a user with the interconnecting virtual visual object 620.

In some examples the user may interact with the virtual object 21, representing the interconnecting virtual visual object 620, in the virtual visual space 20 as previously described. The user may, for example, be able to disconnect the interconnecting virtual visual object 620 from the sound-source virtual visual object 610 to which it is interconnected and leave it disconnected or interconnect it to a different sound-source virtual visual object 610.

The user may likewise disconnect the interconnecting virtual visual object 620 from the user-controlled virtual visual object 630 to which it is connected and connect it to a different part of that user-controlled virtual visual object 630 or connect it to a different user-controlled virtual visual object 630.

The user may also be able to change different characteristics of the interconnecting virtual visual object 620. The user may, for example, lengthen it or change its route or widen it or change its colour or add a note to it or change its appearance 622 in some other way. The user may change the ordering of the interconnecting virtual visual objects 620 from the same sound-source virtual visual object 610 or may change the ordering of the interconnecting virtual visual objects 620 to the same user-controlled virtual visual object 630.

It will therefore be appreciated that the user can have significant control over the appearance 622 of the interconnecting virtual visual object 620 and also over the position of any or at least some of the sound-source virtual visual objects 610 to which the interconnecting virtual visual objects 620 are interconnected.

It will therefore be appreciated that in this way the user has significant control over the configuration of the sound-source virtual visual objects 610 and the interconnecting virtual visual objects 620 and that this in turn may provide significant control over the characteristics 714 of the rendered sound object 710 and over the positions 712 at which the rendered sound objects 710 are rendered.

FIGS. 15A to 16B illustrate different examples in which the interconnecting virtual visual object 620 may have its appearance 622 varied.

In the examples of FIGS. 15A to 15D, a single interconnecting virtual visual object 620 has an appearance 622. This interconnecting virtual visual object 620 is a virtual object 21 as previously described and will be rendered as a visual element 28 as previously described. The figures also illustrate a sound-source virtual visual object 610 which is also a virtual object 21 and may be a visual element 28 and also a user-controlled virtual visual object 630 which is also a virtual object 21 and may be a visual element 28.

The visual appearance of each interconnecting virtual visual object 620 may be dependent upon one or more characteristics of the sound object associated with the sound-source virtual visual object 610 to which the interconnecting virtual visual object is interconnected. The one or more characteristics may, for example, be one or more of the number of channels, loudness of a channel, ordering of channels, distortion to each channel, an associated sound scene, a positioning error value.

In the example of FIG. 15A, and the other examples, the interconnecting virtual visual object 620 may be considered to be a virtual cable interconnecting or capable of interconnecting a sound-source virtual visual object 610 and the user-controlled virtual visual object 630.

In the example of FIG. 15A the virtual cable 620 extends between and interconnects the sound-source virtual visual object 610 and the user-controlled virtual visual object 630. It has a first colour and a first width.

In the example of FIG. 15B the width of the cable 620 has been increased but the cable is otherwise unchanged. This increase in width may indicate that a characteristic such as loudness of the sound object associated with the sound-source virtual visual object 610 has changed e.g. increased.

In the example of FIG. 15C the cable 620 has been disconnected from the user-controlled virtual visual object 630. A user can for example, prevent a sound object being rendered as a rendered sound object in a rendered sound space by disconnecting the interconnecting virtual visual object 620 that interconnects visually the sound-source virtual visual object 610 associated with that sound object and the user-controlled virtual visual object 630.

In the example of FIG. 15D the colour of the cable 620 has been changed. This change in colour may indicate that a characteristic such as distortion of the sound object associated with the sound-source virtual visual object 610 has changed. For example, the colour may turn red if there is danger of distortion such as clipping of the sound source.

In the example of FIG. 15D instead of the colour of the cable 620 being changed it could illustrate that information associated with the virtual cable has changed. This change in information content may indicate that a characteristic such as positional accuracy of the sound object associated with the sound-source virtual visual object 610 has changed. For example, the information may be provided relating to the accuracy of tracking a position of the sound sources such as Kalman filter values.

In the example of FIG. 16A two cables extend from the sound-source virtual visual object 610 to the user-controlled virtual visual object 630. The changes in appearance 622 that have been described in relation to FIGS. 15B, 15C and 15D may be individually applied to each of these separate cables if desired. It is also possible to switch the order of the cables as shown in FIG. 16B by a single user action.

FIG. 17 illustrates an example of a virtual visual space 20 similar to that illustrated in FIG. 13, except that instead of displaying a plurality of different sound-source virtual visual objects 610, FIG. 17 displays only a single sound-source virtual visual object 610 at different positions 612 at different times. A first position 612 is illustrated by using dashed lines to draw the sound-source virtual visual object and a second position 612' is illustrated by using dotted lines to draw the sound-source virtual visual object 610. An interconnecting virtual visual object 620 extends from the sound-source virtual visual object 610 at the first position 612 to an input port 631 of the user-controlled virtual visual object 630. The interconnecting virtual visual object 620 is presented as a visual element 28 in the virtual visual space 20 and has an appearance 622. When the virtual visual object 610 has been moved to the second position 612 the interconnecting virtual visual object 620 remains connected to the port 631 of the user-controlled virtual visual object 630 but the appearance 622 of the interconnecting virtual visual object 620 has changed at least because the path between the port 631 of the user-controlled virtual visual object 630 and the newly positioned sound-source virtual visual object 610 has changed.

It will therefore be appreciated that each interconnecting virtual visual object 620, which may be in the form of a virtual cable, is dependent upon a position of the sound-source virtual visual object 610 in the three-dimensional virtual visual space 20 relative to the port 631 of the user-controlled virtual visual object 630 in the virtual visual space 20 to which the interconnecting virtual visual object 620 is connected.

As previously described, the audio processing of the sound object 510 associated with the sound-source virtual visual object 610 to produce the rendered sound object or objects 710 depends upon or may depend upon user-positioning of the associated sound-source virtual visual object 610 in the virtual visual space 20 and/or user reconfiguration of the interconnecting virtual visual object 620 between the sound-source virtual visual object 610 and the user-controlled virtual visual object 630. Although FIG. 17 illustrates this only in respect of a single sound-source virtual visual object 610 it should be appreciated that this may be replicated for multiple sound-source virtual visual objects 610.

Figure 18:
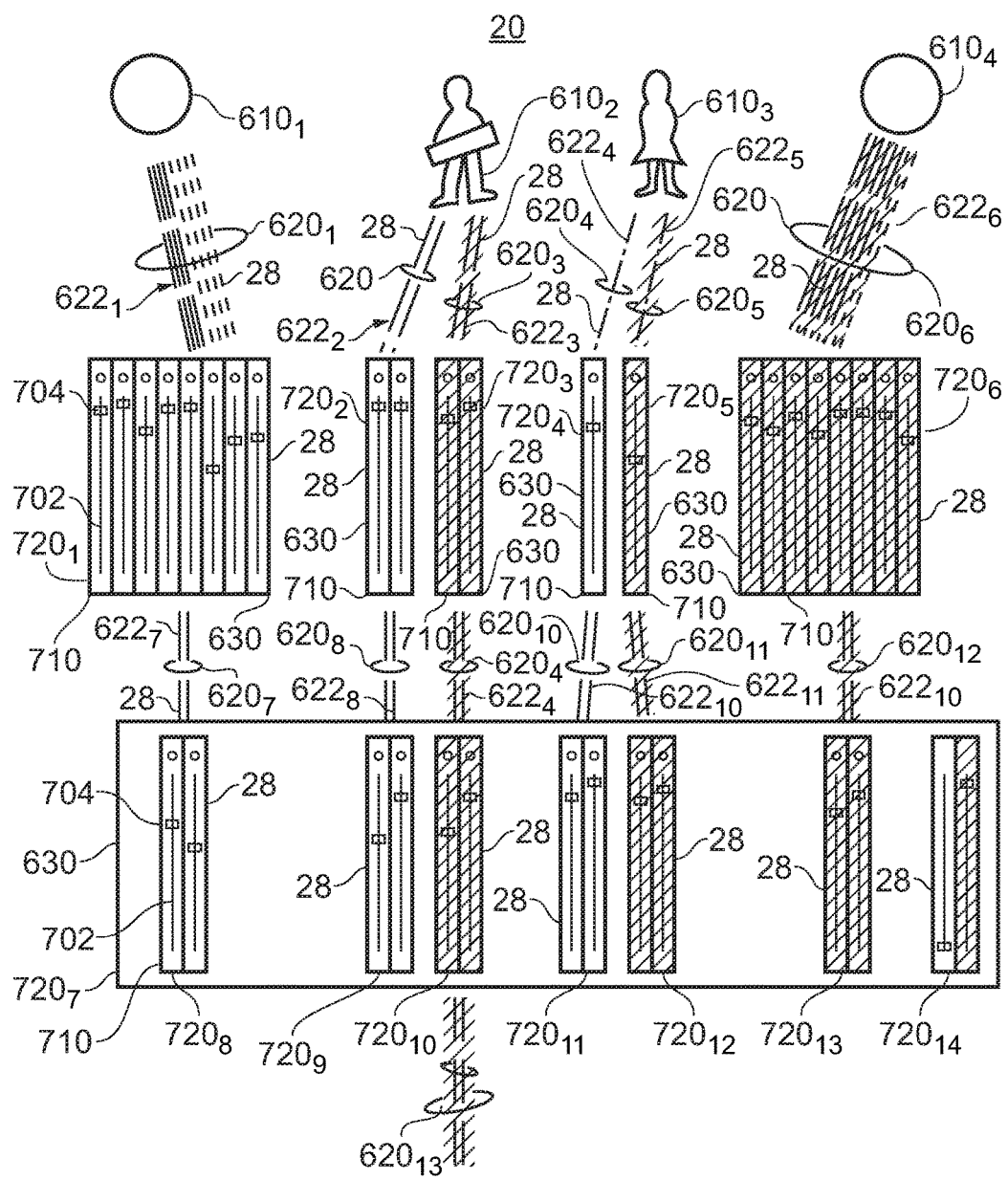
FIG. 18 illustrates one example of a virtual visual space that is presented to a user as virtual reality or augmented reality on, for example, a head-mounted device.

In some examples, for example as illustrated in FIG. 18, the user-controlled virtual visual object 630 may comprise one or more visual elements 28 configured for user interaction within the virtual visual space. In the example of FIG. 18 a plurality of sliders 704 that move on a slide 702 are displayed as distinct visual element 28 such that the slider 704 may be moved by a user relative to the slide 702. However this is only one type of user input 710 and other types of user input 710 are possible.

In some examples the visual elements 28 representing the user input 720 in the virtual visual space 20 may be aligned with a real object such as a mixing desk in real space such that the user-controlled virtual visual object 630 in the virtual space 20 is augmented reality for the real space. In this example, the augmented reality interface provides information that is layered on the real mixing desk which enables a user of the real mixing desk to have a greater understanding of how the mixing desk is used to render audio objects 710.

FIG. 18 illustrates one example of a virtual visual space 20 that is presented to a user as virtual reality or augmented reality on, for example, a head-mounted device. In this example, the sound-source virtual visual objects 610 may be artificial virtual objects in a virtual reality implementation or they may be real world objects in an augmented reality implementation. In the examples of FIG. 18 one or more mixing desks 720 are illustrated as one or more virtual objects 21 in the virtual space 20. In some implementations the user-controlled virtual visual objects 630 may be artificially generated virtual objects for example in a virtual reality implementation or they may be real world objects in an augmented reality implementation.

In this example interconnecting virtual cables (interconnecting virtual visual objects) 620 are virtual objects 21 that are artificial virtual objects comprising one or more virtual visual elements 28. These cables 620 therefore are artificially generated and exist only in the virtual environment either in the augmented reality implementation as layered over a real world scene or in a virtual reality implementation as generated within an artificially generated scene.

In this example, at a first level, a first sound-source virtual visual object $610_1$ is interconnected to a first user-controlled virtual visual object 630 (first mixing desk $720_1$) by a virtual cable $620_1$.

A second sound-source virtual visual object $610_2$ is interconnected to a second user-controlled virtual visual object 630 (second mixing desk $720_2$) via a second virtual cable $620_2$ and the same sound-source virtual visual object $610_2$ is interconnected to a third user-controlled virtual visual object 630 (third mixing desk $720_3$) via a third virtual cable $620_3$.

A third sound-source virtual visual object $610_3$ is interconnected to a fourth user-controlled virtual visual object 630 (fourth mixing desk $720_4$) via a fourth virtual cable $620_4$ and the same sound-source virtual visual object $610_3$ is interconnected to a fifth user-controlled virtual visual object 630 (fifth mixing desk $720_5$) via a fifth virtual cable $620_5$.

A fourth sound-source virtual visual object $610_4$ is interconnected to a fifth user-controlled virtual visual object 630 (sixth mixing desk $720_6$) via a sixth virtual cable $620_6$.

Each of the mixing desks $720_1$ to $720_6$ is associated with one of the virtual cables $620_1$ to $620_6$ and is used to mix the sound object or objects conveyed by that virtual cable from the attached sound source virtual object(s) 610, in accordance with the user inputs 710 of the sub-mixing desk to produce sound objects as outputs represented by respective virtual cables $620_7$ to $620_{12}$.

In this example, at a second level, the first mixing desk $720_1$, which is a sound source virtual visual object, is interconnected to the master mixing desk $720_7$ via a seventh virtual cable $620_7$. The second mixing desk $720_2$, which is a sound source virtual visual object, is interconnected to the master mixing desk $620_7$ by a virtual cable $620_8$. The mixing desk $720_3$, which is a sound source virtual visual object, is interconnected to the master mixing desk $720_7$ by the virtual cable $620_9$. The mixing desk $720_4$, which is a sound source virtual visual object, is interconnected to the master mixing desk $720_7$ via a virtual cable $620_{10}$. The mixing desk $720_5$, which is a sound source virtual visual object, is interconnected to the master mixing desk $720_7$ by the virtual cable $620_{11}$. The mixing desk $720_6$, which is a sound source virtual visual object, is interconnected to the master mixing desk $720_7$ via the virtual cable $620_{12}$. The master mixing desk $720_7$ is a user-controlled virtual visual object 630.

It will be appreciated that each of the virtual cables 620 described in relation to FIG. 18 is an interconnecting virtual visual object 620 as previously described. Each of the interconnecting virtual visual objects 620 is connected with a sound-source virtual visual object 610 and to a destination user-controlled virtual visual object 630. The visual appearance of each interconnecting virtual visual object 620 is dependent upon one or more characteristics of the sound object associated with the sound-source virtual visual object 610 to which the interconnecting virtual visual object 620 is interconnected.

For example, each of the audio channels associated with the sound-source represented by the sound-source virtual visual object $610_1$ is represented as a different virtual cable 620 which are bundled together to form a bundle of virtual cables 620. It will be appreciated that the position and/or characteristics of a sound-source controls the appearance 622 of the downstream interconnecting cable or bundle of cables 620 that interconnect to the downstream user-controlled virtual visual object 630. Thus in the example of FIG. 18 the position and/or characteristics of the recorded sound-sources associated with the sound-source virtual visual object $610_1$, $610_2$, $610_3$ and $610_4$ lead from representations of the recorded sound-sources to mixing desks 720.

However at the next level of hierarchy, where the sound-source virtual visual object 610 is a first level mixing desk $720_1$ to $720_6$ then the virtual cables or bundles of virtual cables $620_7$ to $620_{12}$ interconnect respective the first level mixing desks $720_1$ to $720_6$ to the master mixing desk $720_7$.

It should be appreciated that the appearance of the virtual cables or bundles of virtual cables 620 between the first level mixing desks $720_1$ to $720_6$ and the master mixing desk $720_7$ also have a visual appearance 622 that is dependent upon one or more characteristics of the sound object associated with the sound-source virtual visual object 610 to which the interconnecting virtual visual object 620 is interconnected. In these examples the sound object associated with the sound-source virtual visual object 610 may be a sound object that represents mixed audio that has been mixed in dependence upon the positions of the user controls 710 in the mixing desks 720.

There is also an interconnecting virtual visual object 620 that interconnects the output of the master mixing desk 720. This virtual cable $620_{13}$ represents the audio output of the entire mixing process.

The master mixing desk $720_7$ comprises a number of sub-mixing desks $720_8$ to $720_{14}$.

Each of the mixing desks $720_8$ to $720_{14}$ is associated with one of the virtual cables $620_7$ to $620_{12}$ and is used to mix the sound object or objects conveyed by that virtual cable from the attached sound source virtual object(s) 610, in accordance with the user inputs 710 of the sub-mixing desk to produce sound objects as outputs represented by the virtual cable $620_{13}$.

It will therefore be appreciated that at a first level of the hierarchical level of the structure, there is display of a sound-source virtual visual object ($610_1$ to $610_4$) in a three-dimensional virtual visual space 20. There is also display of a multiplicity of interconnecting virtual visual objects ($620_1$ to $620_6$) in the three-dimensional virtual visual space 20. At least some of the multiplicity of interconnecting virtual visual objects $620_1$ to $620_6$ interconnect visually a sound-source virtual visual object ($610_1$ to $610_4$) and a user-controlled virtual visual object ($720_1$ to $720_6$). The visual appearance ($622_1$ to $622_6$) of each interconnecting virtual visual object ($620_1$ to $620_6$) is dependent upon one or more characteristics of a sound object associated with the sound-source virtual visual object ($610_1$ to $610_4$) to which the interconnecting virtual visual object ($620_1$ to $620_6$) is interconnected. Audio processing of the sound objects to produce rendered sound objects depends upon user interaction with the user-controlled virtual visual object ($720_1$ to $720_6$) and user-controlled interconnection of interconnecting virtual visual objects ($620_1$ to $620_6$) between sound-source virtual visual objects ($610_1$ to $610_4$) and the user-controlled virtual visual object ($720_1$ to $720_6$).

At the second lower level of hierarchy within FIG. 18, there is display of sound-source virtual visual objects ($720_1$ to $720_6$) in a three-dimensional virtual visual space 20. There is display of a multiplicity of interconnecting virtual visual objects ($620_7$ to $620_{12}$) in the three-dimensional virtual visual space 20. At least some of the multiplicity of interconnecting virtual visual objects ($620_7$ to $620_{12}$) interconnect visually a sound-source virtual visual object ($720_1$ to $720_6$) and a user-controlled virtual visual object ($720_7$ to $720_{13}$). A visual appearance ($622_7$ to $622_{12}$) of each interconnecting virtual visual object ($620_7$ to $620_{12}$) is dependent upon one or more characteristics of a sound object ($720_1$ to $720_6$) associated with the sound-source virtual visual object ($720_1$ to $720_6$) to which the interconnecting virtual visual object ($620_7$ to $620_{12}$) is interconnected. Audio processing of the sound objects to produce rendered sound objects depends on user interaction with the user-controlled virtual visual object ($720_7$ to $720_{14}$) and user-controlled interconnection of interconnecting virtual visual objects ($620_7$ to $620_{12}$) between sound-source virtual visual objects ($720_1$ to $720_6$) and the user-controlled virtual visual object ($720_7$ to $720_{14}$).

It will be appreciated that a user can change the interconnection of a sound-source virtual visual object to a user-controlled virtual visual object, can change the position of a sound-source virtual visual object and can change the appearance of an interconnecting virtual visual object 620 to control rendering of the sound objects 720 in a rendered sound scene 700.

It should be appreciated that in the example of FIG. 18, each of the virtual cables 620 comprises a number of channels represented by virtual cables 620 within a bundle of virtual cables. At the first level, the visual appearance of a virtual cable 620 may be used for example to display the loudness associated with that channel or some other audio characteristic. Appearance may also be used to indicate information concerning the positioning of the sound-source virtual visual object 610. For example if a position of the sound-source virtual visual object 610 is based upon a position of a recorded sound-source automatically then it may be desirable to provide some information concerning what error there may be in the positioning of the sound-source and consequently what error there may be in positioning the sound-source virtual visual object 610 representing that sound-source in the virtual visual space 20.

In the example illustrated in FIG. 18 each of the channels has its own panning control 710 which allows the individual intensity of that channel to be controlled by for example placing a slider 704 at a particular position along the slide 702.

In the second level, the interconnecting virtual visual objects $620_7$ to $620_{12}$ may use different aspects of the appearance to indicate different characteristics of the audio. For example at this level, a width of the virtual cable 620 within a bundle of virtual cables may be used to indicate the loudness of the mixed channel represented by that virtual cable 620.

It will be appreciated that at this level the output from the various mixing desks $720_1$ to $720_6$ is a dual channel output represented by a pair of virtual cables 620.

FIG. 18 also illustrates that it is possible to have two different points of views of the same sound space creating different rendered sound scenes 700. A "sound scene" refers to a representation of the sound space listened to from a particular point of view within the sound space.

In this example the virtual cables $620_3$ $620_5$ and $620_6$, the intermediate mixing desks $720_3$ $720_5$ and $720_6$, the next level of virtual cables $620_9$ $620_{11}$ and $620_{12}$ and the lower level of mixing desks $720_{10}$ $720_{12}$ and $720_{13}$ have a different background colour to the other virtual cables and mixing desks. This indicates that they represent a first sound scene. The other virtual cables and mixing desks represent a different second sound scene.

A sound scene may relate to a certain listening point of view (position and orientation). When the user listens the audio from an sound space, he will experience the directional audio as if his head was at a particular location with a particular orientation, for example, the location may correspond to a particular spatial audio capture device and the sound sources are rendered from their corresponding locations with respect of that particular audio capture device. The particular location and listening point of view may correspond to the location of a virtual reality camera.

The mixer $720_{14}$ may be used to control which sound scene is currently listened to and in what proportion. The left user input 710 controls the influence of the second sound scene on the output represented by the virtual cable $620_{13}$. The right user input 710 controls the influence of the first sound scene on the output represented by the virtual cable $620_{13}$.

In this example the output from the master mixer $720_7$, controlled by the scene mixer $720_{14}$ is entirely influenced by the audio associated with the first sound scene and is not influenced at all by the other sound objects.

Figure 19A:
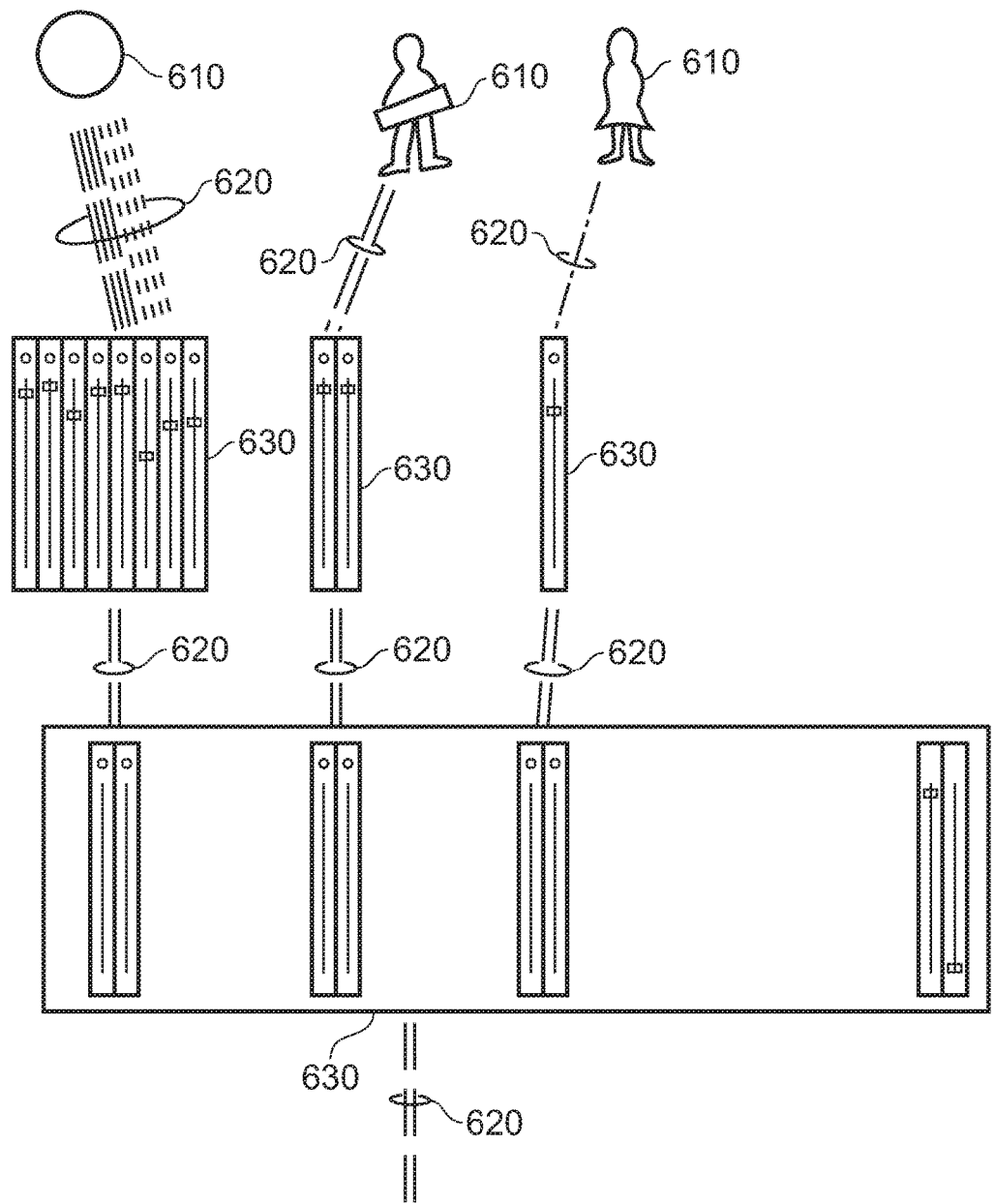
FIG. 19A and FIG. 19B illustrate how a user can control the virtual visual space to display on a particular scene.
Figure 19B:
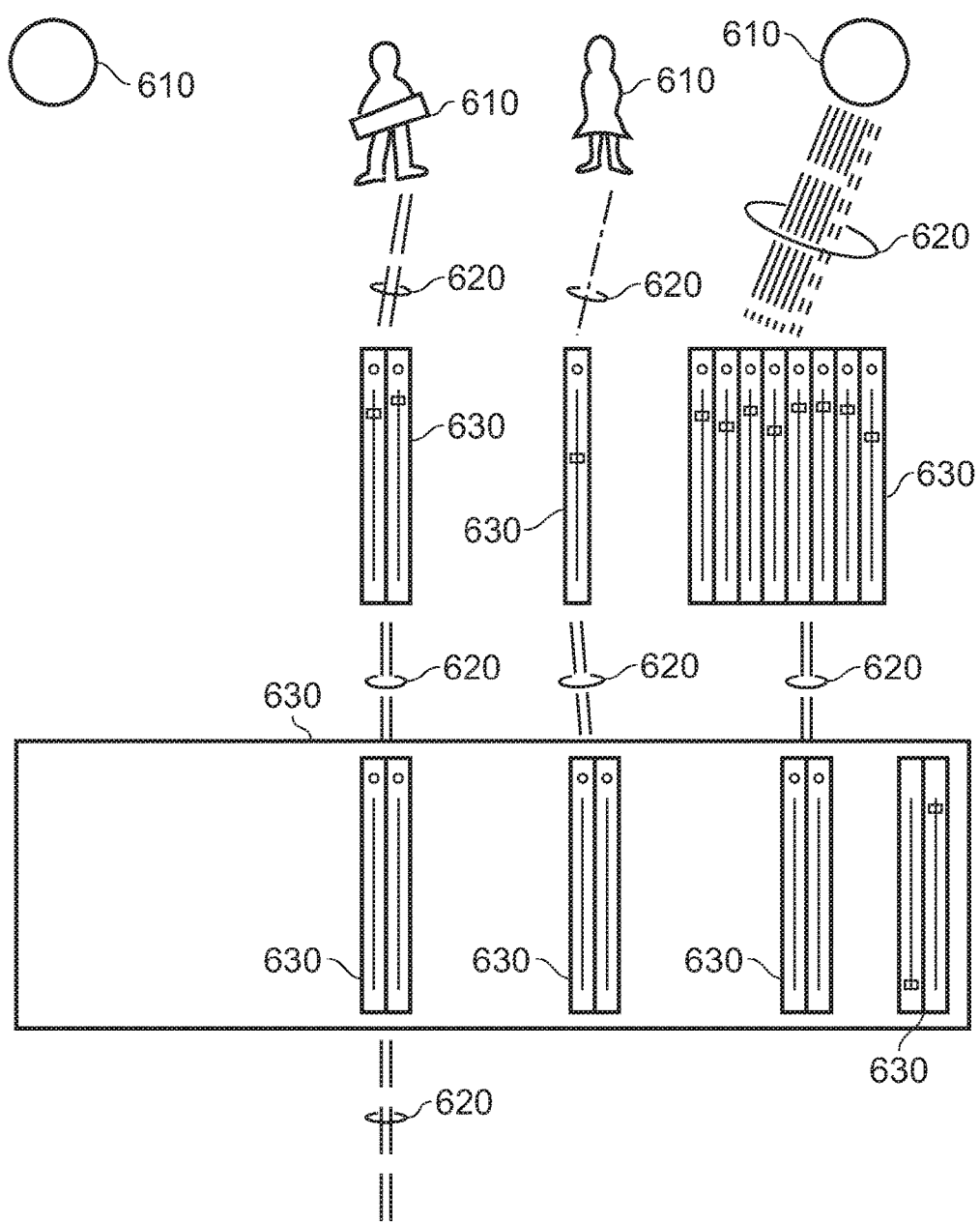

The consequence of this, in an alternative example, is shown in FIG. 19B. In this example only the virtual cables and mixing desks of the first sound scene are displayed.

However, if the slider positions in scene mixer $720_{14}$ are reversed then the outcome would be as illustrated in FIG. 19A. In this example only the virtual cables and mixing desks of the second scene are displayed.

It will therefore be appreciated that the user may be able to move between different scene views or mix different scene views.

The representation in the virtual visual space 20 provided in FIG. 18 allows a user to readily comprehend a very complex audio processing situation and also allows the user to control and manage sound mixing in a simpler and more intuitive way.

In the foregoing examples, reference has been made to a computer program or computer programs. A computer program, for example either of the computer programs 48, 416 or a combination of the computer programs 48, 416 may be configured to perform the method 520.

Also as an example, an apparatus 30, 400 may comprises:
at least one processor 40, 412; and
at least one memory 46, 414 including computer program code
the at least one memory 46, 414 and the computer program code configured to, with the at least one processor 40, 412, cause the apparatus 430, 00 at least to perform:
    causing display of a sound-source virtual visual object in a three-dimensional virtual visual space;
    causing display of a multiplicity of interconnecting virtual visual objects in the three-dimensional virtual visual space, wherein at least some of the multiplicity of interconnecting virtual visual objects interconnect visually a sound-source virtual visual object and a user-controlled virtual visual object,
    wherein a visual appearance of each interconnecting virtual visual object, is dependent upon one or more characteristics of a sound object associated with the sound-source virtual visual object to which the interconnecting virtual visual object is interconnected,
    causing audio processing of the sound objects to produce rendered sound objects depends on user-interaction with the user-controlled virtual visual object and user-controlled interconnection of interconnecting virtual visual objects between sound-source virtual visual objects and the user-controlled virtual visual object.

Also as an example, an apparatus 30, 400 may comprises:
at least one processor 40, 412; and at least one memory 46, 414 including computer program code the at least one memory 46, 414 and the computer program code configured to, with the at least one processor 40, 412, cause the apparatus 430, 00 at least to perform: causing display of a sound-source virtual visual objects in a three-dimensional virtual visual space for each of a plurality of associated recorded sound objects representing sounds recorded at different positions, wherein a position at which a recorded sound object is rendered as a rendered sound object in a rendered sound space is dependent upon a position of the associated sound-source virtual visual object in the virtual visual space; causing display of a multiplicity of interconnecting virtual visual objects in the three-dimensional virtual visual space, wherein each of the multiplicity of interconnecting virtual visual objects interconnects visually a sound-source virtual visual object and a user-controlled virtual visual object, wherein each interconnecting virtual visual object is dependent upon a position of the associated sound-source virtual visual object in the three dimensional virtual visual space relative to the interconnected control virtual visual object in the virtual visual space; and causing audio processing of the recorded sound objects to produce rendered sound objects depends on user-interaction with the user-controlled virtual visual object and user-controlled interconnection of interconnecting virtual visual objects between sound-source virtual visual objects and the user-controlled virtual visual object.

The computer program 48, 416 may arrive at the apparatus 30, 400 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48, 416. The delivery mechanism may be a signal configured to reliably transfer the computer program 48, 416. The apparatus 30, 400 may propagate or transmit the computer program 48, 416 as a computer data signal. FIG. 10 illustrates a delivery mechanism 430 for a computer program 416.

It will be appreciated from the foregoing that the various methods 500 described may be performed by an apparatus 30, 400, for example an electronic apparatus 30, 400.

The electronic apparatus 400 may in some examples be a part of an audio output device 300 such as a head-mounted audio output device or a module for such an audio output device 300. The electronic apparatus 400 may in some examples additionally or alternatively be a part of a head-mounted apparatus 33 comprising the display 32 that displays images to a user.

In some examples, the placement of the head-mounted apparatus 33 onto the head of a user may cause the system to perform or to be able to perform the method 520. That is, while the head-mounted apparatus 33 is not placed on a head of a user, the method 520 is not operational. When the head-mounted apparatus is placed on a head of a user, the method 520 becomes operational enabling control using first perspective, user-interactive, mediated reality (virtual reality or augmented reality).

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks, steps and processes illustrated in the FIGS. 11-19B may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 or controller 410 may, for example be a module. The apparatus may be a module. The display 32 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed. For example, although embodiments of the invention are described above in which multiple video cameras 510 simultaneously capture live video images 514, in other embodiments it may be that merely a single video camera is used to capture live video images, possibly in conjunction with a depth sensor.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising at least one processor and at least one memory, the memory comprising machine-readable instructions, that when executed cause the apparatus to:
   display a sound-source virtual visual object in a three-dimensional virtual visual space; and
   display a multiplicity of interconnecting virtual visual objects in the three-dimensional virtual visual space, wherein at least some of the multiplicity of interconnecting virtual visual objects interconnect visually the sound-source virtual visual object and a user-controlled virtual visual object,
   wherein a visual appearance of each interconnecting virtual visual object, is dependent upon one or more characteristics of a sound object associated with the sound-source virtual visual object to which the interconnecting virtual visual object is interconnected, and
   wherein audio processing of the sound object to produce a rendered sound object depends on user-interaction with the user-controlled virtual visual object and user-controlled interconnection of interconnecting virtual visual objects between sound-source virtual visual objects and the user-controlled virtual visual object.

2. An apparatus as claimed in claim 1 wherein display a sound-source virtual visual object in a three dimensional virtual visual space, comprises displaying the sound-source virtual visual object in the three dimensional virtual visual space for each of a plurality of associated recorded sound objects representing sounds recorded at different positions.

3. An apparatus as claimed in claim 1, wherein a position at which a sound object is rendered as a rendered sound object in a rendered sound space is dependent upon a position of the associated sound-source virtual visual object in the virtual visual space.

4. An apparatus as claimed in claim 1 further caused to: automatically vary a position at which a sound object is rendered as a rendered sound object in a rendered sound space in dependence upon a variation in a position of the associated sound-source virtual visual object in the virtual visual space.

5. An apparatus as claimed in claim 4, wherein the variation in the position of the associated sound-source virtual visual object in the virtual visual space is caused by user variation in the position of the associated sound-source virtual visual object in the virtual visual space or automatic variation of a position of the associated sound-source virtual visual object in the virtual visual space based on position tracking of a recorded sound source.

6. An apparatus as claimed in claim 1, wherein an initial position at which a sound object is rendered as a rendered sound object in a rendered sound space is dependent upon a position of the associated sound-source virtual visual object in the virtual visual space which is determined automatically by an initial position of the recorded sound source, each of the multiplicity of interconnecting virtual visual objects being automatically arranged to interconnect visually a sound-source virtual visual object and the user-controlled virtual visual object, and automatically having a visual appearance dependent upon one or more initial characteristics of the sound object associated with the sound-source virtual visual object to which the interconnecting virtual visual object is interconnected.

7. An apparatus as claimed in claim 1 further caused to: automatically vary an appearance of an interconnecting virtual visual object in dependence upon variation of one or more characteristics of the sound object associated with the sound-source virtual visual object to which the interconnecting virtual visual object is interconnected or in dependence upon variation of a position of the associated sound-source virtual visual object in the virtual visual space.

8. An apparatus as claimed in claim 1, wherein a visual appearance of each interconnecting virtual visual object is dependent upon one or more characteristics of the sound object associated with the sound-source virtual visual object to which the interconnecting virtual visual object is interconnected, the one or more characteristics comprising one or more of: number of channels, loudness of a channel, ordering of channels, distortion to each channel, an associated sound scene, a positioning error value.

9. An apparatus as claimed in claim 1, wherein each interconnecting virtual visual object is dependent upon a position of the associated sound-source virtual visual object in the three dimensional virtual visual space relative to the interconnected control virtual visual object in the virtual visual space.

10. An apparatus as claimed in claim 1 further caused to: prevent a sound object being rendered as a rendered sound object in a rendered sound space by enabling user disconnection of an interconnecting virtual visual object that interconnects visually a sound-source virtual visual object associated with the sound object and the user-controlled virtual visual object.

11. An apparatus as claimed in claim 1, wherein audio processing of the sound object to produce a rendered sound object depends on user-positioning of the associated sound-source virtual visual objects in the virtual visual space and/or user-reconfiguration of interconnecting virtual visual objects between the sound-source virtual visual objects and the user-controlled virtual visual object.

12. An apparatus as claimed in claim 1 further caused to: display at least one control virtual visual object in the virtual visual space comprising one or more visual elements configured for user interaction within the virtual visual space, wherein the at least one control virtual visual object is aligned with a mixing desk in real space.

13. An apparatus as claimed in claim 1 further caused to: display a sound-source virtual visual object in a three-dimensional virtual visual space for each of a plurality of mixing desk objects.

14. An apparatus as claimed in claim 1 further caused to: display multiple control virtual visual objects in a virtual visual space and display of interconnecting virtual visual objects between the user-controlled virtual visual objects wherein a visual appearance of each interconnecting virtual visual object is dependent upon one or more characteristics of the sound mix associated with a first one of the user-controlled virtual visual objects from which the interconnecting virtual visual object is interconnected to a second one of the user-controlled virtual visual objects.

15. A computer-implemented method comprising:
causing display of a sound-source virtual visual object in a three-dimensional virtual visual space; and
causing display of a multiplicity of interconnecting virtual visual objects in the three-dimensional virtual visual space, wherein at least some of the multiplicity of interconnecting virtual visual objects interconnect visually the sound-source virtual visual object and a user-controlled virtual visual object,
wherein a visual appearance of each interconnecting virtual visual object, is dependent upon one or more characteristics of a sound object associated with the sound-source virtual visual object to which the interconnecting virtual visual object is interconnected, and
wherein audio processing of the sound object to produce a rendered sound object depends on user-interaction with the user-controlled virtual visual object and user-controlled interconnection of interconnecting virtual visual objects between sound-source virtual visual objects and the user-controlled virtual visual object.

16. A method as claimed in claim 15 wherein causing the display of a sound-source virtual visual object in a three dimensional virtual visual space, comprises causing display of the sound-source virtual visual object in the three dimensional virtual visual space for each of a plurality of associated recorded sound objects representing sounds recorded at different positions.

17. A method as claimed in claim 15, wherein a position at which a sound object is rendered as a rendered sound object in a rendered sound space is dependent upon a position of the associated sound-source virtual visual object in the virtual visual space.

18. A method as claimed in claim 15 further comprising automatically varying a position at which a sound object is rendered as a rendered sound object in a rendered sound space in dependence upon a variation in a position of the associated sound-source virtual visual object in the virtual visual space.

19. A method as claimed in claim 18, wherein the variation in the position of the associated sound-source virtual visual object in the virtual visual space is caused by user variation in the position of the associated sound-source virtual visual object in the virtual visual space or automatic variation of a position of the associated sound-source virtual visual object in the virtual visual space based on position tracking of a recorded sound source.

20. At least one non-transitory computer readable medium comprising instructions that, when executed, perform:
display a sound-source virtual visual object in a three-dimensional virtual visual space; and
display a multiplicity of interconnecting virtual visual objects in the three-dimensional virtual visual space, wherein at least some of the multiplicity of interconnecting virtual visual objects interconnect visually the sound-source virtual visual object and a user-controlled virtual visual object,
wherein a visual appearance of each interconnecting virtual visual object, is dependent upon one or more characteristics of a sound object associated with the sound-source virtual visual object to which the interconnecting virtual visual object is interconnected, and
wherein audio processing of the sound object to produce a rendered sound object depends on user-interaction with the user-controlled virtual visual object and user-controlled interconnection of interconnecting virtual visual objects between sound-source virtual visual objects and the user-controlled virtual visual object.

* * * * *

UNITED STATES PATENT AND TRADEMARK OFFICE
CERTIFICATE OF CORRECTION

PATENT NO. : 10,366,542 B2
APPLICATION NO. : 15/680502
DATED : July 30, 2019
INVENTOR(S) : Lehtiniemi et al.

Page 1 of 1

It is certified that error appears in the above-identified patent and that said Letters Patent is hereby corrected as shown below:

On the Title Page

Item (54), reads "AUDIO PROCESSING FOR VIRTUAL OBJECTS IN THREE-DIMENSIONAL VIRTUAL VISUAL SPACE"
Should read -- AUDIO PROCESSING FOR VIRTUAL VISUAL OBJECTS IN THREE-DIMENSIONAL VIRTUAL VISUAL SPACE --

Signed and Sealed this
Fourth Day of February, 2020

Andrei Iancu
*Director of the United States Patent and Trademark Office*